US011306572B2

(12) United States Patent
Ruhle et al.

(10) Patent No.: US 11,306,572 B2
(45) Date of Patent: Apr. 19, 2022

(54) HYDRAULIC FRACTURING MODELLING AND CONTROL

(71) Applicant: HALLIBURTON ENERGY SERVICES, INC., Houston, TX (US)

(72) Inventors: William Owen Alexander Ruhle, Denver, CO (US); Ronald Glen Dusterhoft, Katy, TX (US); Ajish Potty, Missouri City, TX (US); Joshua Lane Camp, Friendswood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 30 days.

(21) Appl. No.: 16/899,210

(22) Filed: Jun. 11, 2020

(65) Prior Publication Data

US 2021/0010359 A1   Jan. 14, 2021

Related U.S. Application Data

(60) Provisional application No. 62/965,698, filed on Jan. 24, 2020, provisional application No. 62/873,716, filed on Jul. 12, 2019.

(51) Int. Cl.
*E21B 43/26* (2006.01)
*E21B 47/06* (2012.01)
(Continued)

(52) U.S. Cl.
CPC .............. *E21B 43/26* (2013.01); *E21B 47/06* (2013.01); *E21B 47/07* (2020.05); *E21B 47/10* (2013.01);
(Continued)

(58) Field of Classification Search
CPC ...................................................... E21B 43/26
See application file for complete search history.

(56) References Cited

U.S. PATENT DOCUMENTS 6,644,844 B2   11/2003   Neal et al.
8,886,502 B2 *  11/2014   Walters ................... E21B 43/16
                                                          703/10
(Continued)

FOREIGN PATENT DOCUMENTS

WO        2016086138 A1     6/2016

OTHER PUBLICATIONS

International Search Report and Written Opinion, PCT Application No. PCT/US2020/041836, dated Nov. 6, 2020.

*Primary Examiner* — Kenneth L Thompson
(74) *Attorney, Agent, or Firm* — Polsinelli PC

(57) ABSTRACT

Aspects of the subject technology relate to systems and methods for controlling a hydraulic fracturing job. A fracturing completion model can be applied to identify a plurality of possible fracturing completion plans for completing one or more wellbores at a target completion. The plurality of possible fracturing completion plans can include varying values of fracturing completion parameters and/or reservoir parameters. Completion characteristic data of the one or more wellbores can be gathered in response to application of at least a portion of a fracturing completion plan of the possible fracturing completion plans. Further, the completion characteristic data can be used to determine whether to apply a different fracturing completion plan of the possible fracturing completion plans. In turn, if it is determined to apply the different fracturing completion plan, then the method can include facilitating switching to the different fracturing completion plan in completing the one or more wellbores.

20 Claims, 7 Drawing Sheets

(51) Int. Cl.

| | | |
|---|---|---|
| *E21B 47/07* | (2012.01) | |
| *E21B 47/10* | (2012.01) | |
| *G01V 8/10* | (2006.01) | |
| *G01V 1/18* | (2006.01) | |
| *G01L 1/22* | (2006.01) | |
| *G01V 1/40* | (2006.01) | |
| *G06N 20/00* | (2019.01) | |
| *G06N 5/04* | (2006.01) | |
| *E21B 49/00* | (2006.01) | |
| *E21B 43/267* | (2006.01) | |
| *E21B 43/14* | (2006.01) | |

(52) U.S. Cl.
CPC ............... *E21B 49/00* (2013.01); *G01L 1/22* (2013.01); *G01V 1/18* (2013.01); *G01V 1/40* (2013.01); *G01V 8/10* (2013.01); *G06N 5/045* (2013.01); *G06N 20/00* (2019.01); *E21B 43/14* (2013.01); *E21B 43/267* (2013.01); *E21B 43/2607* (2020.05); *E21B 2200/20* (2020.05); *G01V 2210/1429* (2013.01)

(56) References Cited

U.S. PATENT DOCUMENTS

| | | | |
|---|---|---|---|
| 10,329,888 B2* | 6/2019 | Urbancic | E21B 43/26 |
| 10,570,704 B2* | 2/2020 | Colvin | E21B 43/305 |
| 10,577,908 B2* | 3/2020 | Kisra | G01V 1/50 |
| 10,605,060 B2* | 3/2020 | Chuprakov | E21B 43/26 |
| 10,738,580 B1 | 8/2020 | Fischer et al. | |
| 10,760,416 B2* | 9/2020 | Weng | G01V 1/306 |
| 10,851,633 B2* | 12/2020 | Harper | E21B 43/16 |
| 10,914,139 B2* | 2/2021 | Shahri | E21B 43/26 |
| 10,920,538 B2* | 2/2021 | Rodriguez Herrera | E21B 49/00 |
| 10,920,552 B2* | 2/2021 | Rodriguez Herrera | G01V 1/288 |
| 2007/0277982 A1 | 12/2007 | Shampine et al. | |
| 2011/0030963 A1 | 2/2011 | Demong et al. | |
| 2013/0140031 A1* | 6/2013 | Cohen | E21B 43/26 166/308.1 |
| 2015/0176387 A1 | 6/2015 | Wutherich | |
| 2015/0204174 A1* | 7/2015 | Kresse | E21B 43/26 166/250.01 |
| 2016/0108713 A1 | 4/2016 | Dunaeva et al. | |
| 2017/0051598 A1* | 2/2017 | Ouenes | G06F 30/20 |
| 2017/0177992 A1 | 6/2017 | Klie | |
| 2017/0328179 A1 | 11/2017 | Dykstra et al. | |
| 2018/0016895 A1 | 1/2018 | Weng et al. | |
| 2018/0230780 A1 | 8/2018 | Klenner et al. | |
| 2019/0071946 A1 | 3/2019 | Painter et al. | |
| 2019/0169962 A1 | 6/2019 | Aqrawi et al. | |
| 2021/0010361 A1 | 1/2021 | Kriebel et al. | |
| 2021/0010362 A1 | 1/2021 | Kriebel et al. | |

* cited by examiner

HYDRAULIC FRACTURING MODELLING AND CONTROL

CROSS-REFERENCE TO RELATED APPLICATIONS

This application claims priority to U.S. Provisional Patent Application No. 62/873,716, filed on Jul. 12, 2019, entitled "MULTIPLE WELLBORE HYDRAULIC FRACTURING THROUGH A SINGLE PUMPING SYSTEM" and U.S. Provisional Patent Application No. 62/965,698, filed on Jan. 24, 2020, entitled "HYDRAULIC FRACTURING MODELLING AND CONTROL," the contents of which are incorporated herein by reference in their entirety.

TECHNICAL FIELD

The present technology pertains to controlling a hydraulic fracturing completion of a wellbore based on completion characteristics of the completion, and more particularly, to selecting one or more completion plans from a plurality of completion plans based on the completion characteristics and facilitating completion of the wellbore according to the one or more selected completion plans.

BACKGROUND

Completion of a wellbore through hydraulic fracturing is a complex process. The hydraulic fracturing process includes a number of different variables that can be altered to perform a well completion. Specifically, parameters related to perforation initiation and creation, e.g. through a plug-and-perf technique, can be altered during a hydraulic fracturing process to perform a well completion. Further, parameters related to fracture creation and stabilization can be altered during a hydraulic fracturing process to perform a well completion. Currently, fracturing jobs are performed by operators that rely heavily on their own knowledge and experience to complete a well. Hydraulic fracturing technologies have developed to provide real time fracturing data to operators performing a fracturing job. However, operators still rely on their own knowledge and experience to interpret this real time fracturing data and perform a well completion. This is problematic as operators are often unable to properly interpret the wealth of real time fracturing data that is gathered and provided to them in order to control a hydraulic fracturing job. Specifically, as the hydraulic fracturing process is complex and encompasses a number of different variables that can be altered to perform a well completion, it becomes difficult for operators to alter the variables of the hydraulic fracturing process based on real time fracturing data to properly control a hydraulic fracturing job. As a result, operators tend to rely more heavily on their own knowledge and experience instead of real time fracturing data to control a hydraulic fracturing process, often leading to detrimental effects on a well completion job.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
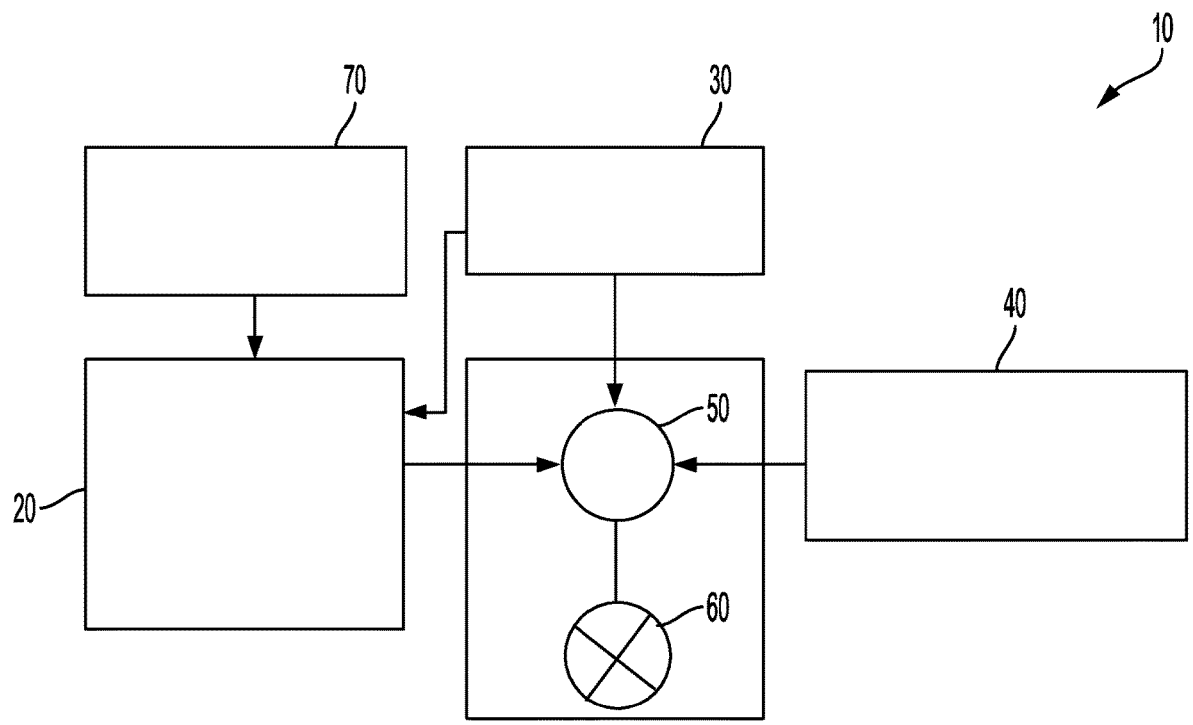
FIG. 1 is a schematic diagram of an example fracturing system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation is made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the cased volume of the well, the amount of fluid that fills the fracture, and the amount of fluid that leaks-off into the formation during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled with proppant to stabilize the fractures.

This process can be repeated in a plurality of fracturing stages to form a plurality of fractures through a wellbore, e.g. as part of a well completion phase. In particular and as will be discussed in greater detail later, this process can be repeatedly performed through a plug-and-perf technique to form the fractures throughout a subterranean formation. After the fractures are formed, resources, e.g. hydrocarbons, can be extracted from the fractures during a well production phase.

There are a number of variables that can be accounted for in designing and performing a hydraulic fracturing process, e.g. for well completion. However, current operators have overly simplified fracturing processes. Specifically, current fracturing processes are designed and performed without accounting for a large number of the different variables of the hydraulic fracturing process. For example, the trend amongst current operators includes pumping more fracturing fluid and more proppant at higher pumping rates in order to complete a fracturing stage as fast possible. Further, the trend amongst current operators includes increasing the number of perforations formed and pumped through during a fracturing stage in order to increase the number of fractures formed and stabilized during the fracturing stage. The driving force behind these trends is to decrease the amount of time it takes current operators to perform a fracturing job, thereby potentially increasing profitability for the operators. Further these trends do not account for other parameters associated with the hydraulic fracturing process that can actually be used to improve capital efficiency in hydraulic fracturing jobs.

It makes logical sense that if a fracturing stage can be completed faster with a higher fracture yield per fracture stage, then an overall fracturing job can be performed faster. However, pumping more fracturing fluid and more proppant at higher rates to more perforations can actually increase the time needed to complete a fracture stage, thereby decreasing overall capital efficiency. Specifically, pumping more fracturing fluid and more proppant at higher rates to a larger number of perforations can lead to premature "screen outs." A screen out can occur when the solid concentration within a fracture becomes so high that the pumping pressure exceeds the design limits of the system. In essence, the proppant plugs the fracture and stops the fracturing process. In other situations, a screen out can occur when the proppant collects at an obstruction or within a fracture that is too narrow, resulting in a screen out as well. As a result of screen outs, the fracturing process must sometimes be stopped because in many situations, continuing pumping will damage surface equipment or the well casing itself, e.g. rupturing the well casing. Further, this can lead to expensive and time consuming wellbore clean outs, e.g. by coil tubing deployed at the fracturing site. As follows, the fracturing process is actually slowed down leading to slower fracturing jobs.

Further, pumping more fluid and more proppant at higher rates can also increase operational costs associated with a fracturing, thereby decreasing overall capital efficiency. In turn, any profit gained by potentially performing the fracturing job faster can actually be negated. Specifically, pumping more fluid and more proppant at higher pumping rates can actually damage pumps and other equipment. This necessitates costly repairs and equipment replacement, in addition to increasing the amount of actual lost time for repairing and replacing the pumps. Specifically, pumping fluid and proppant at higher pumping rates can increase friction pressure within a well. This increased friction pressure can increase fatigue and erosion in pumps and other applicable components used in the fracturing process. As follows, the pumps and the equipment fail faster, thereby increasing operation costs for performing a fracturing job.

The disclosed technology addresses the foregoing by pumping to multiple wellbores through a single pump (or bank of pumps) of a pumping system during a fracturing stage, and more specifically to concurrently pumping to multiple wellbores through a single pump (or bank of pumps) of a pumping system during a fracturing stage.

In various embodiments, a method for conducting a hydraulic fracturing job on a plurality of wellbores in a subterranean formation using the same pump (or bank of pumps) can include selecting a fluid pump of known operating pump capacity. The known operating pump capacity can be measurable in barrels per minute. The method can also include fluidly connected with each of a plurality of cased wellbores in a subterranean formation for providing pumped fracturing fluid to each of the wellbores. Each of the plurality of wellbores can have at least one perforation through a casing of the wellbore. Further, each perforation can have a known rate range within which fracturing fluid is required to be provided to the perforation to successfully fracture the subterranean formation outside the perforation, through the perforation. The wellbores constituting the plurality of wellbores that are fluidly connected to the pump (or bank of pumps) can be configured so that the pump (or bank of pumps) provides fracturing fluid to each of the perforations within the known rate range of the respective perforation to successfully fracture the subterranean formation outside the perforation.

In various embodiments, a single pumping system for conducting a hydraulic fracturing job on a plurality of wellbores in a subterranean formation can include a fluid pump of known operating pump capacity, wherein the operating pump capacity is measurable in barrels per minute. The single pumping system can also include one or more fluid couplings that fluidly connect the pump with each of a plurality of cased wellbores in a subterranean formation for providing pumped fracturing fluid to each of the wellbores. Each of the plurality of wellbores can have at least one perforation through a casing of the wellbore and each perforation can have a known rate range within which fracturing fluid is required to be provided to the perforation to successfully fracture the subterranean formation outside the perforation, through the perforation. Further, the wellbores constituting the plurality of wellbores that are fluidly connected to the pump can be configured so that the pump provides fracturing fluid to each of the perforations within the known rate range of the respective perforation to successfully fracture the subterranean formation outside the perforation.

In various embodiments, a single pumping system for conducting a hydraulic fracturing job on a plurality of wellbores in a subterranean formation can include a fluid pump (or bank of pumps) of known operating pump capacity, wherein the operating pump capacity is measurable in barrels per minute. The single pumping system can also include one or more fluid couplings that fluidly connect the pump with each of a plurality of cased wellbores in a subterranean formation for providing pumped fracturing fluid to each of the wellbores concurrently during the hydraulic fracturing job. Each of the plurality of wellbores can have at least one perforation through a casing of the wellbore and each perforation can have a known rate range within which fracturing fluid is required to be provided to the perforation to successfully fracture the subterranean formation outside the perforation, through the perforation. Further, the wellbores constituting the plurality of wellbores that are fluidly connected to the pump (or bank of pumps) can be configured so that the pump (or bank of pumps) provides fracturing fluid concurrently to each of the perforations within the known rate range of the respective perforation to successfully fracture the subterranean formation outside the perforation.

Turning now to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. As will be discussed in greater detail later, the additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
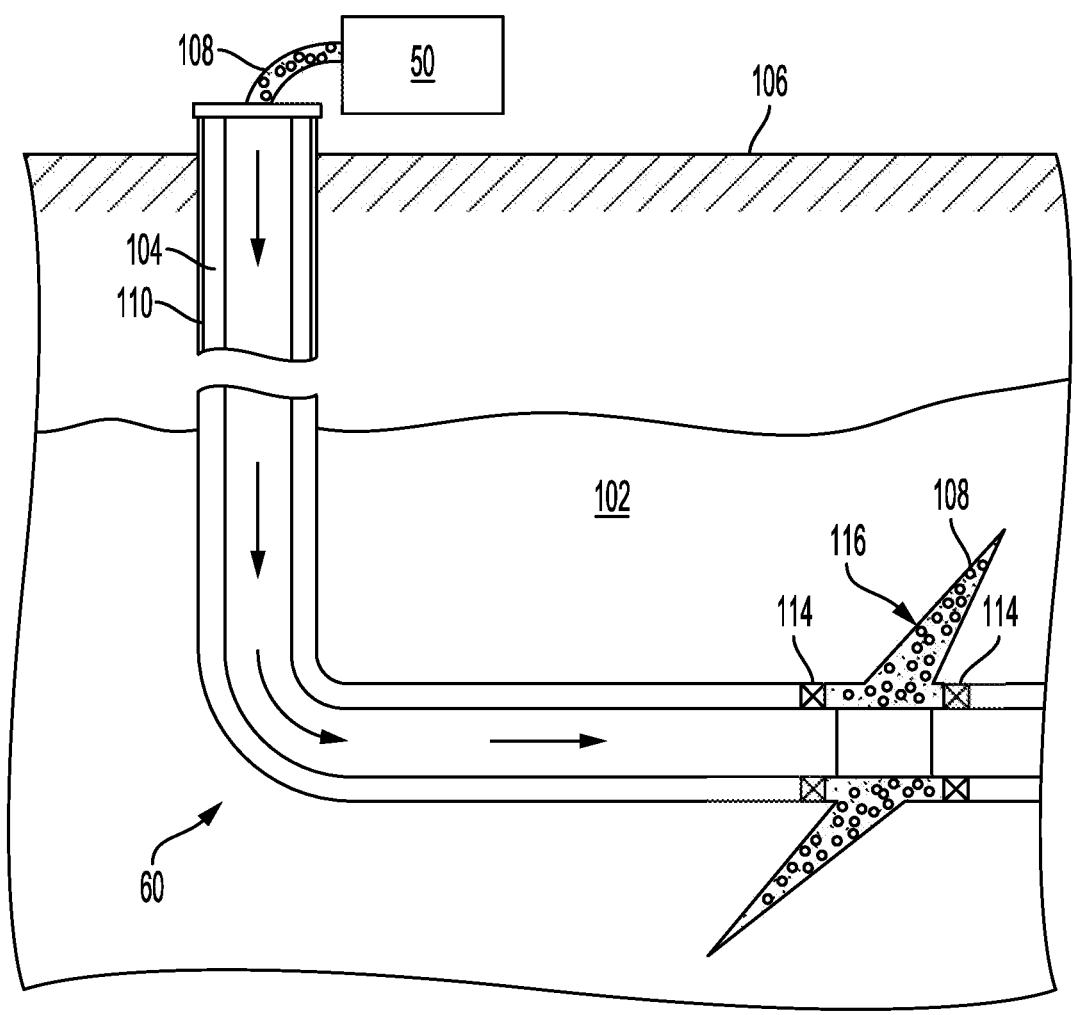
FIG. 2 shows a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
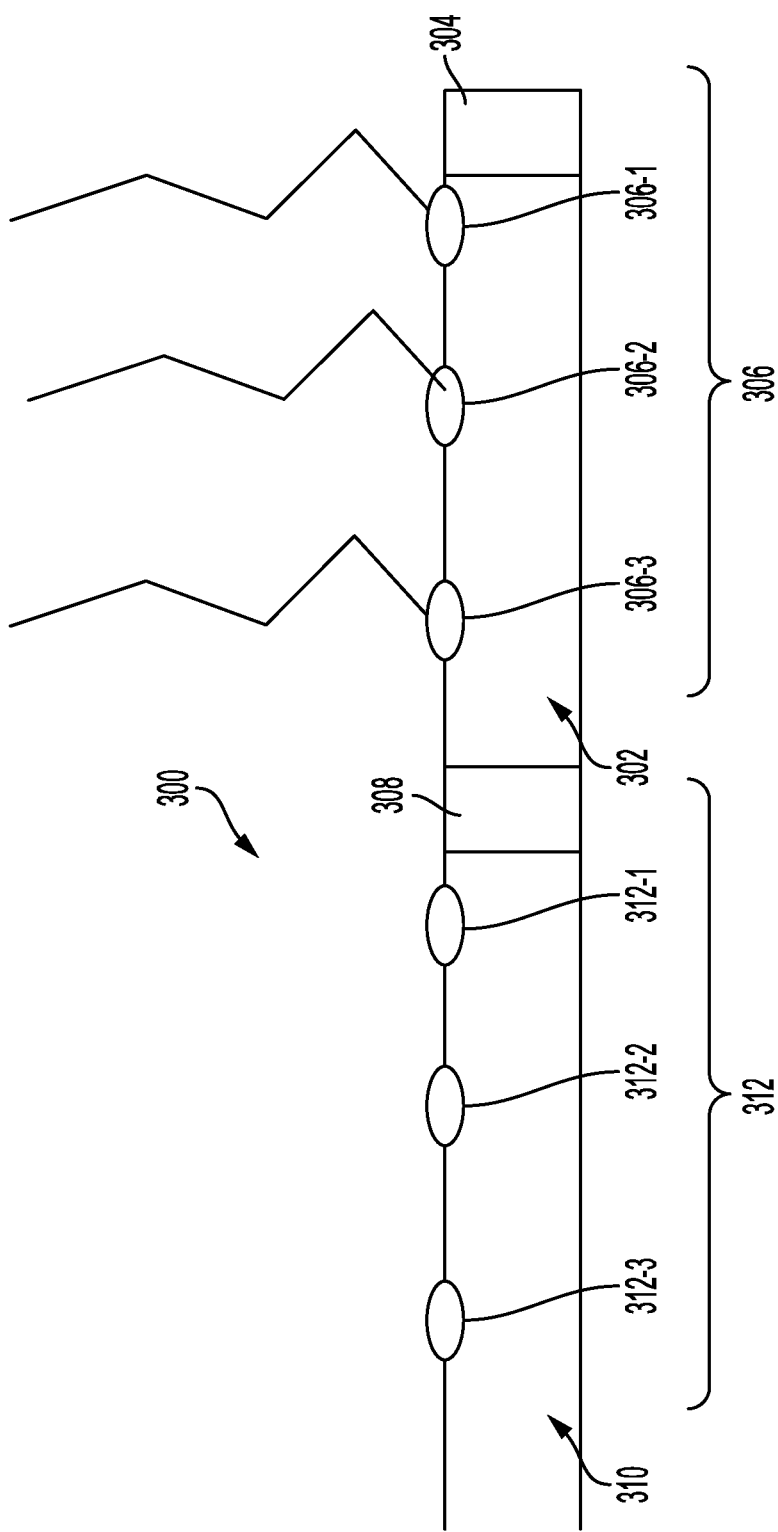
FIG. 3 shows a portion of a wellbore that is fractured using multiple fracture stages, in accordance with various aspects of the subject technology.

FIG. 3 shows a portion of a wellbore 300 that is fractured using multiple fracture stages. Specifically, the wellbore 300 is fractured in multiple fracture stages using a plug-and-perf technique.

The example wellbore 300 includes a first region 302 within a portion of the wellbore 300. The first region 302 can be positioned in proximity to a terminal end of the wellbore 300. The first region 302 is formed within the wellbore 300, at least in part, by a plug 304. Specifically, the plug 304 can function to isolate the first region 302 of the wellbore 300 from another region of the wellbore 300, e.g. by preventing the flow of fluid from the first region 302 to the another region of the wellbore 300. The region isolated from the first region 302 by the plug 304 can be the terminal region of the wellbore 300. Alternatively, the region isolated from the first region 302 by the plug 304 can be a region of the wellbore 300 that is closer to the terminal end of the wellbore 300 than the first region 302. While the first region 302 is shown in FIG. 3 to be formed, at least in part, by the plug 304, in various embodiments, the first region 302 can be formed, at least in part, by a terminal end of the wellbore 300 instead of the plug 304. Specifically, the first region 302 can be a terminal region within the wellbore 300.

The first region 302 includes a first perforation 306-1, a second perforation 306-2, and a third perforation 306-3. The first perforation 306-1, the second perforation 306-2, and the third perforation 306-3 can form a perforation cluster 306 within the first region 302 of the wellbore 300. While three perforations are shown in the perforation cluster 306, in various embodiments, the perforation cluster 306 can include fewer or more perforations. As will be discussed in greater detail later, fractures can be formed and stabilized within a subterranean formation through the perforations 306-1, 306-2, and 306-3 of the perforation cluster 306 within the first region 302 of the wellbore 300. Specifically, fractures can be formed and stabilized through the perforation cluster 306 within the first region 302 by pumping fracturing fluid and solid particles into the first region 302 and through the perforations 306-1, 306-2, and 306-3 into the subterranean formation.

The example wellbore 300 also includes a second region 310 positioned closer to the wellhead than the first region 302. Conversely, the first region 302 is in closer proximity to a terminal end of the wellbore 300 than the second region 310. For example, the first region 302 can be a terminal region of the wellbore 300 and therefore be positioned closer to the terminal end of the wellbore 300 than the second region 310. The second region 310 is isolated from the first region 302 by a plug 308 that is positioned between the first region 302 and the second region 310. The plug 308 can fluidly isolate the second region 310 from the first region 302. As the plug 308 is positioned between the first and second regions 302 and 310, when fluid and solid particles are pumped into the second region 310, e.g. during a fracture stage, the plug 308 can prevent the fluid and solid particles from passing from the second region 310 into the first region 302.

The second region 310 includes a first perforation 312-1, a second perforation 312-2, and a third perforation 312-3. The first perforation 312-1, the second perforation 312-2, and the third perforation 312-3 can form a perforation cluster 312 within the second region 310 of the wellbore 300. While three perforations are shown in the perforation cluster 312, in various embodiments, the perforation cluster 312 can include fewer or more perforations. As will be discussed in greater detail later, fractures can be formed and stabilized within a subterranean formation through the perforations 312-1, 312-2, and 312-3 of the perforation cluster 312 within the second region 310 of the wellbore 300. Specifically, fractures can be formed and stabilized through the perforation cluster 312 within the second region 310 by pumping fracturing fluid and solid particles into the second region 310 and through the perforations 312-1, 312-2, and 312-3 into the subterranean formation.

In fracturing the wellbore 300 in multiple fracturing stages through a plug-and-perf technique, the perforation cluster 306 can be formed in the first region 302 before the second region 310 is formed using the plug 308. Specifically, the perforations 306-1, 306-2, and 306-3 can be formed before the perforations 312-1, 312-2, and 312-3 are formed in the second region 310. As will be discussed in greater detail later, the perforations 306-1, 306-2, and 306-3 can be formed using a wireline-free actuation. Once the perforations 306-1, 306-2, and 306-3 are formed, fracturing fluid and solid particles can be transferred through the wellbore 300 into the perforations 306-1, 306-2, and 306-3 to form and stabilize fractures in the subterranean formation as part of a first fracturing stage. The fracturing fluid and solid particles can be transferred from a wellhead of the wellbore 300 to the first region 302 through the second region 310 of the wellbore 300. Specifically, the fracturing fluid and solid particles can be transferred through the second region 310 before the second region 310 is formed, e.g. using the plug 308, and the perforation cluster 312 is formed. This can ensure, at least in part, that the fracturing fluid and solid particles flow through the second region 310 and into the subterranean formation through the perforations 306-1, 306-2, and 306-3 within the perforation cluster 306 in the first region 302.

After the fractures are formed through the perforations 306-1, 306-2, and 306-3, the wellbore 300 can be filled with the plug 308. Specifically, the wellbore 300 can be plugged with the plug 308 to form the second region 310. Then, the perforations 312-1, 312-2, and 312-3 can be formed, e.g. using a wireline-free actuation. Once the perforations 312-1, 312-2, and 312-3 are formed, fracturing fluid and solid particles can be transferred through the wellbore 300 into the perforations 312-1, 312-2, and 312-3 to form and stabilize fractures in the subterranean formation as part of a second fracturing stage. The fracturing fluid and solid particles can be transferred from the wellhead of the wellbore 300 to the second region 310 while the plug 308 prevents transfer of the fluid and solid particles to the first region 302. This can effectively isolate the first region 302 until the first region 302 is accessed for production of resources, e.g. hydrocarbons. After the fractures are formed through the perforation cluster 312 in the second region 310, a plug can be positioned between the second region 310 and the wellhead, e.g. to fluidly isolate the second region 310. This process of forming perforations, forming fractures during a fracture stage, followed by plugging on a region by region basis can be repeated. Specifically, this process can be repeated up the wellbore towards the wellhead until a completion plan for the wellbore 300 is finished.

Figure 4:
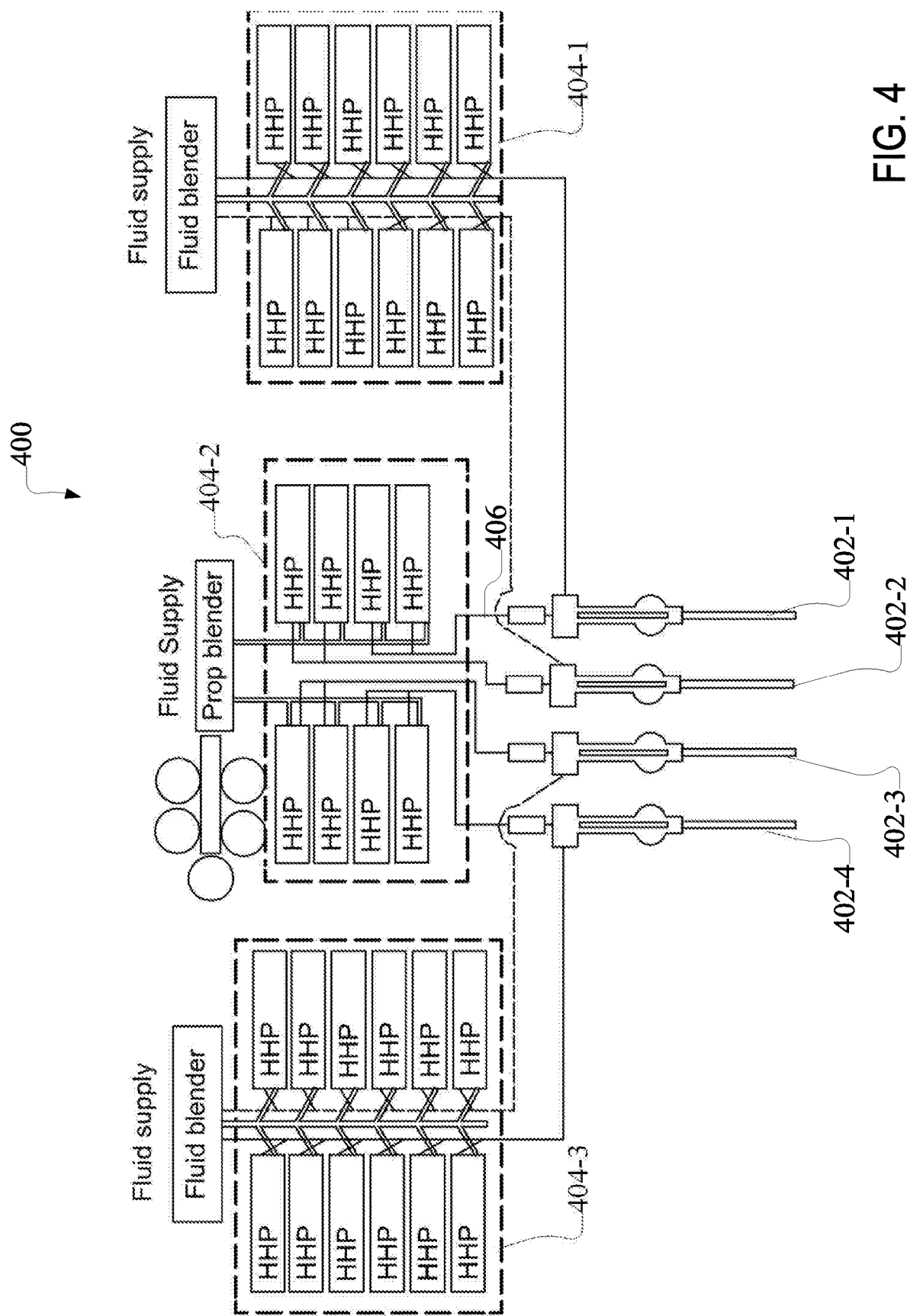
FIG. 4 shows an example fracturing system for concurrently performing fracturing stages in multiple wellbores, in accordance with various aspects of the subject technology.

FIG. 4 shows an example fracturing system 400 for concurrently performing fracturing stages in multiple wellbores. The example fracturing system 400 can be implemented using one or an applicable combination of the components shown in the example fracturing system 10 shown in FIG. 1. Further, the example fracturing system 400 can form fractures according to the example techniques implemented in the well 60 shown in FIG. 2 and the wellbore 300 shown in FIG. 3.

The example fracturing system 400 includes a first wellbore 402-1, a second wellbore 402-2, a third wellbore 402-3, and a fourth wellbore 402-4, collectively referred to as the wellbores 402. While four wellbores 402 are shown, the fracturing system 400 can include three or two wellbores, as long as the fracturing system 400 includes more than one wellbore. Further, the fracturing system 400 can include more than four wellbores.

The example fracturing system 400 also includes a first pump 404-1, a second pump 404-2, and a third pump 404-3, collectively referred to as a pumping system 404. While the pumping system is shown as including three separate pumps, the pumping system 404 can include fewer than three pumps or more than three pumps. For example, the pumping system 404 can include only a single pump.

The pumping system 404 is fluidly connected to each of the wellbores 402. Specifically, the pumping system 404 can be fluidly connected to each of the wellbores 402, at least in part, through one or more fluid couplings, e.g. fluid coupling 406. In being fluidly connected to each of the wellbores 402, the pumping system 404 can pump fracturing fluid and solid particles, e.g. proppant, into the wellbores 402 for forming and stabilizing fractures through the wellbores 402. Specifically, the pumping system 404 can pump fracturing fluid and solid particles into the wellbores 402 for forming and stabilizing fractures through passages and/or perforations in the wellbores 402. The pumping system 404 can pump fracturing fluid into the wellbores 402 for forming fractures in the wellbores 402 according to the previously described plug-and-perf technique. Further, the pumping system 404 can pump solid particles, e.g. proppant, in a solid-laden fluid stream into the wellbores 402 for stabilizing the fractures according to the previously described plug-and-perf technique. As will be discussed in greater detail below, in being fluidly connected to each of the wellbores 402, the pumping system 404 can pump additional components, e.g. additives, into the wellbores 402 for aiding in the formation and/or stabilization of fractures in the wellbores 402.

With specific reference to the example fracturing system 400 shown in FIG. 4, the first pump 404-1 can pump fracturing fluid to the first wellbore 402-1 and the second wellbore 402-2. Specifically, the first pump 404-1 can pump fracturing fluid mixed by a fluid blender from a fluid supply to the first wellbore 402-1 and the second wellbore 402-2. The third pump 404-3 can pump fracturing fluid to the third wellbore 402-3 and the fourth wellbore 402-4. Specifically, the third pump 404-3 can pump fracturing fluid mixed by a fluid blender from a fluid supply to the third wellbore 402-3 and the fourth wellbore 402-4. The third pump 404-3 and the first pump 404-1 can pump fracturing fluid from the same fluid supply into the wellbores 402. Alternatively, the third pump 404-3 and the first pump 404-1 can pump fracturing fluid from different fluid supplies into the wellbores 402.

The pumping system 404, e.g. the second pump 404-2, can pump solid particles in a solid laden fluid stream to one or more of the wellbores 402. Specifically, the second pump 404-2 can pump proppant in a proppant laden fluid stream to one or more of the wellbores 402 for stabilizing fractures formed through the wellbores 402. While reference is made throughout this description to pumping solid particles, the solid particles are actually pumped in a slurry or otherwise a solid laden fluid stream. The solid laden fluid streams can be pumped by the pumping system 404 to wellheads of one or more of the wellbores 402. One or more liquid-phase-only fluid streams, e.g. fracturing fluid, can also be pumped by the pumping system 404, e.g. the first pump 404-1 and the third pump 404-3, to the wellheads of the one or more wellbores 402. In turn, the solid laden fluid stream can be mixed with the liquid-phase-only fluid stream(s) at or near the corresponding wellheads of the one or more wellbores 402 to form a mixed fluid stream of both solid particles, e.g. proppant, and fluid, e.g. fracturing fluid. After the mixed fluid stream is formed at or near the corresponding wellheads of the one or more wellbores 402, the mixed fluid stream can flow into the one or more wellbores 402 for forming and/or stabilizing fractures through the wellbores 402. The solid laden fluid streams and the liquid-phase-only fluid streams can be simultaneously pumped to wellheads of the one or more wellbores 402. This can facilitate effective mixing of the solid laden fluid streams and the liquid-phase-only fluid streams at or near the wellheads to form the mixed fluid stream.

The solid laden fluid stream can have an applicable concentration of solid particles, e.g. proppant. For example, the solid laden fluid stream can have a solid particle concentration of 8 pounds per gallon of liquid. Further, the solid laden fluid stream and the liquid-phase-only fluid stream can be mixed at applicable proportions to form the mixed fluid stream. For example, the solid laden fluid stream and the liquid-phase-only fluid stream can be mixed at one part solid laden fluid stream to two parts liquid-phase-only fluid stream proportions, one part solid laden fluid stream to three parts liquid-phase-only fluid stream proportions, one part solid laden fluid stream to four parts liquid-phase-only fluid stream proportions, or one part solid laden fluid stream to five parts liquid-phase-only fluid stream proportions.

The solid laden fluid stream can be pumped at a lower rate, e.g. with respect to a rate at which the liquid-phase-only fluid stream is pumped by the pumping system 404, e.g. the first pump 404-1 and the third pump 404-3. For example, the solid laden fluid stream can be pumped at around 10 barrels per minute (bpm) while the liquid-phase-only fluid stream is pumped around 30 bpm. More specifically, the solid laden fluid stream can be pumped by the pumping system 404, e.g. the second pump 404-2, at a rate from 5 to 15 bpm and the liquid-phase-only fluid stream can be pumped by the pumping system 404, e.g. the first pump 404-1 and/or the third pump 404-3, at rates from 25 to 50 bpm. A resultant pump/flow rate of the mixed fluid stream of the solid laden fluid stream and the liquid-phase-only fluid stream is a combination of both the pump rates of both the solid laden fluid stream and the liquid-phase-only fluid stream. For example, when the solid laden fluid stream is pumped at a rate of 10 bpm and the liquid-phase-only fluid stream is pumped at a rate of 30 bpm, the flow rate of the mixed fluid stream can be 40 bpm.

Pumping the solid laden fluid stream at a reduced rate with respect to the liquid-phase-only fluid stream can reduce erosion and fatigue in the pumping system 404 and connections, e.g. valves, between the pumping system 404 and the wellbores 402. Specifically, the solid particles in the solid laden fluid stream increase friction pressure, e.g. due to drag, in the pumping system 404 and the connections to the wellbores 402. Accordingly, pumping the solid laden fluid stream at the reduced rate reduces friction pressure created by the flow of the solid laden fluid stream through the pumping system 404 and the connections between the pumping system 404 and the wellbores 402. In turn, reducing friction pressure in the pumping system 404 and the connections between the pumping system 404 and the wellbores 402 can effectively reduce erosion and fatigue in the pumping system 404 and the connections. Reducing erosion and fatigue in the pumping system 404 is advantageous as the pumping system 404 is one of the most expensive components of a fracturing job. Therefore, reducing erosion and fatigue in the pumping system 404 can save operators from costly repair and replacement of the pumping system 404. Further, reducing erosion and fatigue in the pumping system 404 can increase operator efficiency by reducing the amount of time that the pumping system 404 is down on a fracturing job due to repair and replacement.

The pumping system 404 can pump fracturing fluid and solid particles, e.g. in a solid laden fluid stream, down multiple wellbores of the wellbores 402. Specifically, the pumping system 404 can pump fracturing fluid and/or solid particles simultaneously down multiple wellbores of the wellbores 402. More specifically, the pumping system 404 can pump fracturing fluid and/or solid particles simultaneously down multiple wellbores to concurrently form and stabilize fractures in the wellbores. The pumping system 404 can pump solid particles down multiple wellbores using the previously described technique of pumping a solid laden fluid stream and a liquid-phase-only fluid stream to wellheads of the wellbores 402. In turn, the solid laden fluid stream and the liquid phase-only fluid streams can mix at the wellheads of the wellbores 402, and the resultant mixed fluid stream can flow down each of the multiple wellbores to form and stabilize fractures through the wellbores.

In pumping fracturing fluid and solid particles down the wellbore 402, the pumping system 404 can pump the fracture fluid and/or solid laden fluid to a reservoir formed between the wellbores 402 and the pumping system 404. The reservoir can be formed through valves between the wellbores 402 and the pumping system 404, e.g. at the wellheads of the wellbores 402. The valves can be controlled to prevent passage of the fracture fluid and/or the solid laden fluid into the wellbores thereby accumulating the fracture fluid and/or the solid laden fluid within the reservoir. In turn the valves can be operated to selectively control fluid flow of the fracturing fluid and/or the solid laden fluid into the wellbores 402 for forming and stabilizing fractures through the wellbores 402.

The pumping system 404 can operate in a damage avoidance mode to pump fracturing fluid and solid particles down the wellbores 402 for forming and stabilizing fractures through the wellbores 402. Operating a pump in a damage avoidance mode can include operating the pump according to one or more applicable operational parameters for reducing or otherwise eliminating operational damage to the pump. Specifically, operating a pump in a damage avoidance mode can include operating the pump at a fluid pressure at around or below a fatigue-inducing value associated with the pump, e.g. a fatigue-inducing value associated with the fluid end of the pump. For example, operating a pump in a damage avoidance mode can include operating the pump at a pumping rate of less than 60 bpm and a corresponding fluid pressure, in order to prevent fatigue in the pump. Further, operating a pump in a damage avoidance mode can include operating the pump at a fluid velocity at around or below an erosion-inducing value associated with the pump, e.g. an erosion-inducing value associated with components of the pump. For example, operating a pump in a damage avoidance mode can include operating the pump at a pumping rate of less than 60 bpm and a corresponding fluid velocity, in order to prevent erosion of applicable components of the pump.

In operating the pumping system 404 in a damage avoidance mode, the pumping system 404 can be controlled to pump fracturing fluid and solid particles down the wellbores at a reduced rate compared to typical pumping rates used by operators at fracturing jobs. As discussed previously, operators at a fracturing job typically pump at the highest rate possible in order to complete the fracturing job faster. For example, operators typically pump at a rate of 90 bpm or more. This is problematic as pumping either or both fracturing fluid and solid particles at these high rates directly leads to pump erosion and fatigue. Specifically, pumping at high rates increases friction pressure in the wellbore caused by drag of the fracturing fluid and the solid particles passing through the wellbore. Friction pressure can include the amount of pressure of a fluid stream that is lost due to drag as the fluid stream passes through the wellbore. As friction pressure in the wellbore increases, the pump has to impart more power on the fluid stream in order to pump the fluid stream through the wellbore at a specific rate. In turn, this can lead to erosion of the pump, e.g. applicable components of the pump, and connections between the pump and the wellbore. Additionally, this can increase fatigue/fatigue cycle loading on the pump. Therefore, in pumping at higher rates current operators at fracturing jobs are actually damaging pumping equipment and wellbore connections through erosion and fatigue. The pumping system 404, however, can be configured to operate in a damage avoidance mode and pump at a rate lower than 90 bpm, e.g. a rate around or lower than 60 bpm. Accordingly, erosion and fatigue of the pumping system 404 can be reduced by operating the pumping system 404 at the reduced rate in the damage avoidance mode.

Further, in operating in a damage avoidance mode to fracture a subterranean formation through perforations, the pumping system 404 can limit erosion of the perforations through the fracturing job. Specifically, pumping proppant through perforations at high rates, as is done in current fracturing jobs, can actually erode the perforations. Perforation erosion can lead to the formation of runaway fractures and create non-uniform fractures within perforation clusters during a fracturing job. Specifically, as eroded perforations grow in size, more proppant can flow in to eroded perforations starving other perforations in a perforation cluster. In turn, this can lead to non-uniform fracture formation through the perforation cluster, which may then result in frac hit/well bashing to adjacent wells. However, pumping in a damage avoidance mode, e.g. at a reduced rate, can limit or otherwise eliminate erosion of perforations caused by proppant passing through the perforations. In turn, this can lead to more uniform fracture formation, e.g. according to a completion plan, during a fracture job.

The pumping system 404 can be controlled to operate in the damage avoidance mode for a specific amount of time with respect to a duration of the fracturing job. A duration of the fracturing job can include the period of time measured from when fracturing fluid is first simultaneously provided to all of the wellbores 402 by the pumping system 404 and continue as long as the pumping system 404 provides fracturing fluid simultaneously to all of the wellbores 402. Further, a duration of the fracturing job can include the period of time measured from when fracturing fluid is first simultaneously provided to any of the wellbores 402 and continue as long as the pumping system 404 provides fracturing fluid to any of the wellbores 402. Additionally, a duration of the fracturing job can include the period of time measured from when fracturing fluid is first simultaneously provided to all of the wellbores 402 by the pumping system 404 and continue as long as the pumping system 404 provides fracturing fluid to any of the wellbores 402.

In controlling operation of the pumping system 404 in the damage avoidance mode based on the duration of the fracturing job, the pumping system 404 can be operated in the damage avoidance mode during a predominance of the duration of the fracturing job. For example, the pumping system 404 can be operated in the damage avoidance mode for seventy percent of the duration of the fracturing job, ninety percent of the duration of the fracturing job, or ninety-five percent of the duration of the fracturing job. Further, the pumping system 404 can be operated in the damage avoidance mode for a substantial entirety of the duration of the fracturing job. For example, the pumping system 404 can be operated in the damage avoidance mode for around ninety-nine percent of the duration of the fracturing job.

One or more pumps of the pumping system 404 have specific operating capacities. An operating capacity of a pump can include an applicable metric for measuring operational limits of the pump. For example, an operating capacity of a pump can include a maximum or threshold pumping rate, e.g. in bpm, of the pump. An operating capacity can include metrics for measuring operational limits at which a pump can safely operate, e.g. without damaging itself. Specifically, an operating capacity of a pump can occur at a substantial operating speed of the pump that is less than a peak operating speed of the pump. One or more pumps of the pumping system 404 can be selected based on corresponding operating capacities of the one or more pumps. Further, one or more pumps of the pumping system 404 can be selected based on their corresponding operating capacities and characteristics of a fracturing job. For example, if a pumping rate of 40 bpm is needed to form fractures in the wellbores 402, then pumps having an operating capacity of at least 80 bpm can be selected for the pumping system 404. Operating capacities of the one or more pumps of the pumping system 404 can be specified by pump manufactures.

A pump can operate in a damage avoidance mode based on an operating capacity of the pump. Specifically, a fluid velocity of a pump operating in a damage avoidance mode can be selected based on an operating capacity of the pump. For example, the pump can operate at a reduced velocity while pumping at a full operating capacity. Additionally, a fluid pressure of a pump operating in a damage avoidance mode can be selected based on an operating capacity of the pump. For example, the pump can operate at a reduced fluid pressure while pumping at a full operating capacity. Further, a reduced rate of a pump operating in a damage avoidance mode can be selected based on an operating capacity of the pump.

The pumping system 404 is configured to pump fracturing fluid and solid particles, as part of a solid laden fluid stream, to perforations or passageways within the wellbores 402 to form and stabilized fractures through the perforations and passageways within the wellbores 402. A passageway, as used herein, includes any type of aperture or conduit across the casing of a wellbore that exposes, e.g. fluidly connects, an interior of the wellbore to a surrounding subterranean formation. For example, a passageway can be formed by activating a sliding sleeve to create an opening that exposes an interior of the wellbore to a surrounding subterranean formation. The perforations and passageways can extend through casings of the wellbores to a surrounding subterranean formation in which fractures can be formed and stabilized. The perforations and passageways can have known rate ranges of fracturing fluid within the perforations and passageways for successfully forming fractures through the subterranean formation. For example, a flow rate of 40 bpm of fracturing fluid through a perforation can be required to form a fracture outside of the perforation through the subterranean formation. In turn, the pumping system 404 can be configured to pump fracturing fluid to a perforation or passageway within a known rate range of the perforation or passageway to successfully form a fracture in the subterranean formation. Specifically, the pumping system 404 can be configured to pump fracturing fluid to a perforation or passageway to achieve a target flow rate per perforation or passageway for successfully fracturing through the perforation or passageway. The pumping system 404 can be configured to pump fracturing fluid to a perforation or passageway within a known rate range for successfully forming a fracture in the subterranean formation through the perforation or passageway while operating in a damage avoidance mode. For example, if a rate of 40 bpm is needed to successfully fracture a subterranean formation through perforations, then the pumping system 404 can operate in a damage avoidance mode while pumping fracturing fluid to the perforation at a rate of 40 bpm to form a fracture in the subterranean formation through the perforations.

The wellbores included in the wellbores 402 that are fluidly connected to the pumping system 404 can be selected based on known rate ranges needed to fracture perforations and passageways in the wellbores. Specifically, a wellbore can be selected for inclusion in the wellbores 402 if it includes a perforation or passageway with a known rate range of fracturing fluid that is capable of being met by the pumping system, e.g. while operating in the damage avoidance mode. For example, if a wellbore includes perforations that require 90 bpm of fluid flow to form fractures in a subterranean formation through the perforations and the pumping system 404 lacks an operational capacity of 90 bpm, then the wellbore can be excluded from the wellbores 402. In another example if a wellbore includes perforations that require 40 bpm of fluid flow to form fractures in a subterranean formation through the perforations and the pumping system 404 has an operational capacity over 40 bpm in a damage avoidance mode, then the wellbore can be included in the wellbores 402.

Perforations and passages in the wellbores 402 can be prepared and designed based on a specific rate range of fracturing fluid for forming fractures through the perforations and passages. For example, perforations in the wellbores 402 can be designed to allow for the successful formation of fractures through the perforations at a fracturing fluid flow rate of 60 bpm or less. In another example, perforations in the wellbores 402 can be designed to allow for the successful formation of fractures through the perforations at a fracturing fluid flow rate of 40 bpm or less. In turn, the specific rate ranges of the perforations and passages for successfully forming fractures can be known based on how the perforations and passages are prepared and designed.

Further, perforations and passages in the wellbores 402 can be prepared and designed based on characteristics of the pumping system 404. The perforations and passages can be sized, shaped, spaced, and formed in perforation clusters, e.g. according to the plug-and-perf technique, in order to facilitate the formation and stabilization of fractures in a subterranean formation through the perforations and passages using the pumping system 404. Specifically, the perforations and passages can be prepared and designed so that at least a majority of the pumping system's 404 known operating capacity is required to successfully fracture the subterranean formation through the perforations and passages during at least a portion of the fracturing job. The perforations and passages can also be prepared and designed such that the pumping system 404 can form and stabilize fractures in a subterranean formation through the perforations and passages while the pumping system 404 operates in a damage avoidance mode. Specifically, the perforations and passages can be prepared and designed such that the pumping system 404 can form and stabilize fractures while operating in a damage avoidance mode at a portion or a majority of the pumping system's 404 know operation capacity. For example, if the pumping system 404 can pump around 40 bpm in a damage avoidance mode, then the perforations in the wellbores 402 can be shaped to facilitate formation of fractures at a flow rate at or less than 40 bpm.

Further, the perforations and passages in the wellbores 402 can be prepared and designed for achieving a target fluid velocity/velocity range of a fluid stream for successfully fracturing a subterranean formation through the perforations and passages. Specifically, the perforations and passages can be designed to achieve a target fluid velocity/velocity range of a fluid stream through the perforations and passages for successfully forming fractures when the fluid stream is pumped at a specific rate. For example, a stream of fracturing fluid can be pumped into a perforation at a rate within the range of 2-5 bpm. Further in the example, the perforation can be sized to create a fluid velocity through the perforation sufficient to fracture a subterranean formation, based on the rate of the fracturing fluid within the range of 2-5 bpm.

Perforations can be formed in perforation clusters in the wellbores 402. A perforation cluster can include an applicable number of perforations with respect to a number of perforations that are typically formed per perforation cluster when operating in a normal pump operation mode, e.g. between 15 and 20 perforations. For example, a perforation cluster can include about six perforations. More specifically, a perforation cluster can include one to four perforations. This is in contrast to fracturing designs used by current operators which typically include more than ten perforations per perforation cluster. Additionally, perforation clusters can be formed amongst a plurality of perforation clusters that are all pumped during a single fracturing stage. The number of perforation clusters that are formed and pumped during a single fracturing stage can be reduced with respect to a typical number of perforation clusters that are formed and pumped during a single fracturing stage. For example, a reduction of about 30 to 40% of the typical number of perforations clusters that are formed during a fracturing stage can be formed and pumped during a single fracturing stage. Specifically, operators typically pump between fifteen and twenty perforation clusters during a single fracturing stage. However, through the techniques and systems described herein, e.g. by operating the pump(s) in a damage avoidance mode, between about eight through thirteen perforation clusters can be pumped and formed during a single fracturing stage.

Forming perforation clusters with fewer perforations and/or forming and pumping less perforation clusters during a fracturing stage is advantageous over the perforation cluster designs used by current fracturing operators. Specifically and as discussed previously, current operators typically form and pump over 15 perforation clusters, each perforation cluster having as many as ten perforations, during a fracturing stage. However, this can lead to the formation of non-uniform fractures across perforation clusters, e.g. when the plug-and-perf technique is used to form the fractures. Specifically, when a large number of perforation clusters with a large number of perforations in each cluster are pumped during a single fracturing stage, perforation clusters in the end of the perforated interval, e.g. further away from the wellhead/heel of the wellbore, do not receive as much fracturing fluid or receive fracturing fluid at a rate below a sufficient rate for fracturing. This can lead to the formation of smaller fractures, e.g. not according to a completion plan, through the perforations in the end perforation clusters. Conversely, perforations in the beginning perforation clusters, e.g. closer to the wellhead/heel of the wellbore, dominate and receive more fracturing fluid and potentially at increased rates when compared to the perforations in the end perforation clusters. This can lead to the formation of runaway fractures through those perforations in the beginning perforation clusters. In turn, the perforations in the end perforation clusters do not receive enough fracture fluid and proppant. As a result, fractures formed through the perforations in the end perforation clusters are smaller than planned or otherwise desired fracture sizes. Therefore, forming perforation clusters with fewer perforations, e.g. about 1 to 4 perforations formed in each perforation cluster, and/or forming and pumping less perforation clusters e.g. about 30 to 40% reduction in total perforation clusters during a fracturing stage can minimize or prevent these deficiencies that are often observed in fracturing stages where a large number of perforation clusters with a large number of perforations are formed and pumped.

Perforations can be formed, e.g. in perforation clusters, through the wellbores 402 using one or more wireline-free actuations. Specifically, a predominance of the perforations in the wellbores 402 can be formed using one or more wireline-free actuations. A wireline-free actuation includes an applicable mechanism for forming perforations within a wellbore, e.g. through a casing within a wellbore without the use of wireline and/or coil tubing. Examples of wireline-free actuations include sliding sleeves, casing-conveyed perforation shaped charges, apertures plugged with water soluble material within a casing of a wellbore, apertures plugged with formation-fluid soluble material within a casing of a wellbore, and apertures plugged with chemically dissolvable material within a casing of a wellbore. Casing-conveyed perforation shaped charges, as part of a wireline-free actuation, can be integrated within a casing of a wellbore, along an interior of a casing of a wellbore, or along an exterior of a casing of a wellbore.

Using a wireline-free actuation to form perforations is advantageous as it is quicker than forming perforations through a wireline or coil tubing technique. Specifically, the process of feeding a wireline and a perforation gun to a desired location in a wellbore, setting off charges on the perforation gun to form perforations in a well casing, and then pulling the wireline and the perforation gun out of the wellbore is extremely time consuming. In particular, feeding a perforation gun and an attached wireline through a horizontal portion of the wellbore is a time consuming process that is prone to error and creates additional safety risks. Specifically, feeding a perforation gun and an attached wireline through a horizontal portion of the wellbore is typically accomplished in one of two ways. In one way, fluid is pumped at a reduced rate, e.g. with respect to a rate at which perforations are pumped in forming and stabilizing fractures, to create drag around the perforation gun and push the perforation gun through the horizontal portion of the wellbore. However, this can be a problematic technique, as pumping the fluid at too high or a rate can create too much tension on the wireline, thereby causing the wireline to disengage from the perforation gun. As a result, coil tubing is needed to retrieve the perforation gun, thereby halting all other fracturing operations on the wellbore. Further, retrieving unfired perforation guns from the wellbore is a safety issue that poses additional risks to operators at the fracturing site. In another way of feeding a perforation gun and a wireline through a horizontal portion of the wellbore, an electrically powered tractor is included on a tool string to drive the perforation gun and attached wireline through the horizontal portion of the wellbore. However, electrically power tractors are prone to failure while increasing operational costs.

Further, wireline or coil tubing techniques typically cannot be performed while hydraulic fracturing treatment is actually pumped into the wellbore to form and stabilize fractures. Therefore, such techniques can consume time that a fracturing crew could otherwise use to actually pump a hydraulic fracture treatment into a wellbore. Specifically, as the wireline is actually fed into the wellbore, a fracturing treatment generally cannot be pumped during the time that the wireline is in the wellbore. Therefore, using wireline-free actuation to form perforations in the wellbores 104 can decrease the amount of time needed to form the actual perforations while increasing the amount of time that can be dedicated to pumping the hydraulic fracture treatments into wellbores 104 during a fracturing job. In turn, this can improve operational efficiency of a fracturing crew in performing the fracturing job. For example, by using wireline-free actuation to perforate the wellbores 402, the pumping system 404 can pump the hydraulic fracturing treatments into wellbores 402 during a predominance of the duration of the fracturing job. In another example, by using wireline-free actuation to perforate the wellbores 402, the pumping system 404 can pump the hydraulic fracturing treatments into wellbores 402 during as much as seventy percent of the duration of the fracturing job. In yet another example, by using wireline-free actuation to perforate the wellbores 402, the pumping system 404 can pump the hydraulic fracturing treatments into wellbores 402 during as much as ninety percent of the duration of the fracturing job. In another example, by using wireline-free actuation to perforate the wellbores 402, the pumping system 404 can pump the hydraulic fracturing treatments into wellbores 402 during as much as ninety-five percent of the duration of the fracturing job. In yet another example, by using wireline-free actuation to perforate the wellbores 402, the pumping system 404 can pump the hydraulic fracturing treatments into wellbores 402 substantially continuously through the entire duration of the fracturing job.

The pumping system 404 can function to pump one or more additives in fluid streams into the wellbores 402. Specifically, the pumping system 404 can pump additives as part of a liquid phase-only fluid stream into the wellbores 402. Alternatively, the pumping system 404 can pump additives as part of a solid laden fluid stream into the wellbores 402. The fracturing system 400 can include an additives blender, not shown, for mixing one or more additives into a volume of fluid, e.g. a fluid stream, pumped by the pumping system 404. For example, the fracturing system 400 can include an additives blender for mixing additives with fracturing fluid which can subsequently be pumped by the pumping system 404. In another example, the fracturing system 400 can include an additives mixer for blending additives with proppant laden fluid which can subsequently be pumped by the pumping system 404. Further, the pumping system 404 can pump one or more additives to wellheads of the wellbores 402, where the additives can be mixed with a fluid stream and subsequently pumped down the wellbores 402.

An additive mixed with a fluid stream that is then pumped by the pumping system 404 into the wellbores 402 can include a solids-suspension-assistance additive. The solids-suspension-assistance additive can be an applicable additive for aiding in the suspension of solids, e.g. proppant, in a fluid, e.g. fracturing fluid. For example, the solids-suspension-assistance additive can comprise one or more of guar gum and hydroxyethyl cellulose. The solid-suspension-assistance additive can function to ensure that solids, e.g. proppant, remain suspended in a fluid stream as the fluid stream is pumped by the pumping system 404 down to perforations or passages in the wellbores 402 to form and stabilize fractures. In turn, addition of the solid-suspension-assistance additive can ensure that volumes of solids, e.g. proppant, do not collect in the wellbores 402, e.g. in the perforations or passages, and cause screen outs within the wellbores 402.

The solids-suspension-assistance additive can function as a viscosifier. Specifically, the solids-suspension-assistance additive can increase the viscosity of a fluid stream, e.g. a solid laden fluid stream, pumped through the wellbores 402 by the pumping system 404. By increasing the viscosity of a fluid stream pumped through the wellbores 402, the solids-suspension-assistance additive can reduce friction pressure within the wellbores 402. In turn, the viscosifier can reduce the likelihood of screen outs occurring in the wellbores 402 during the fracturing job. This is particularly important when the fluid stream is pumped by the pumping system 404 in a damage avoidance mode, e.g. at a lower rate, during which the chances of solid particles settling or becoming trapped in the wellbores 402 can increase.

Specific wellbores of the wellbores 402 can be used to monitor fracturing job effects on the wellbores 402. Specifically, an off-set wellbore of the wellbores 402 can be monitored to identify remote effects in the off-set wellbore that occur as a result of performing a fracturing job in a different wellbore in the wellbores 402. For example, the first wellbore 402-1 can be monitored to measure pressures that are created in the first wellbore 402-1 as a result of a fracturing job performed in the second wellbore 402-2. Further, an off-set wellbore of the wellbores 402 can be monitored to identify localized effects that occur in a wellbore in response to a fracturing job performed in the \wellbore. For example, the second wellbore 402-2 can be monitored to identify micro seismic events occurring in the first wellbore 402-1 as a result of performing a fracturing job in the first wellbore 402-1.

The fracturing system 400 can be configured to commence pumping into at least one of the wellbores 402 before complete removal of a drilling rig associated with the wellbores 402. Specifically, the pumping system 404 can begin pumping at least one of the wellbores 402, while drilling continues to complete all of the wellbores 402. For example, the first wellbore 402-1 can be drilled and the pumping system 404 can be fluidly connected to the first wellbore 402-1 while the second wellbore 402-2 is drilled. Further in the example, the pumping system 404 can begin pumping in the first wellbore 402- as the second wellbore 402-2 is drilled. As follows, once the second wellbore 402-2 is drilled, the pumping system 404 can be fluidly connected to the second wellbore 402-2 and begin or continue to pump on either or both of the first wellbore 402-1 and the second wellbore 402-2. The process of pumping before complete removal of a drilling rig associated with the wellbores 402 can improve operational efficiency in performing the fracturing job.

One or more of the wellbores 402 can be formed through four and one-half inch and smaller casing, while typical wellbores at fracturing sites are formed through five and one-half inch casing. The use of four and one-half inch and smaller casing in the wellbores 402 can be facilitated by operating the pumping system 404 in the damage avoidance mode to form and stabilize fractures through the wellbores 402. Specifically, as smaller casing sizes lead to increased friction pressure as fluid flow rate increases, pumping at reduced rates can allow for the use of four and one-half inch casing or smaller casing without incurring prohibitively high friction pressure. For example, fluid pumped at 90 bpm through a four and one-half inch casing will experience greater friction pressure than fluid pumped at the same rate through a five and one-half inch casing. However, by pumping in the damage avoidance mode, the harmful impact of increased friction pressure caused by pumping through smaller casings is minimized.

The use of smaller casing, e.g. four and one-half inch and smaller casing, is in contrast to current industry trends where larger casing sizes are used. Specifically, current fracturing operators typically use five and one-half inch diameter casing and have begun using six inch diameter casing or seven inch diameter casing. The rationale behind using bigger casing is that fluid can be pumped through the larger casing at faster rates when compared to smaller casing. Specifically, as friction pressure at a given fluid rate decreases as casing size increases, operators can use larger casings to pump fracturing fluid and proppant at faster rates during a fracture job. However, the use of smaller casing has numerous advantageous over using larger casing in fracturing jobs and well completions. For example, smaller casing is cheaper from a material perspective and also cheaper to install, e.g. smaller less expensive wellbores can be drilled. Further, it requires less work to draw fluids out of wellbores having smaller casing. Specifically, it is easier to pump hydrocarbon liquid during a production phase out of wells that are formed with smaller casing because the fluid column is higher.

While the description has made reference to performing fracturing jobs as part of well completion activities, the techniques and systems described herein can be applied to any applicable situation where a fracturing job is performed. Specifically, the techniques and systems for performing a fracturing job, as described herein, can be applied to perform well workover activities. For example, the techniques and systems described herein can be applied in well workover activities to change a completion based on changing hydrocarbon reservoir conditions. In another example, the techniques and systems described herein can be applied in well workover activities to pull and replace a defective completion.

Figure 5:
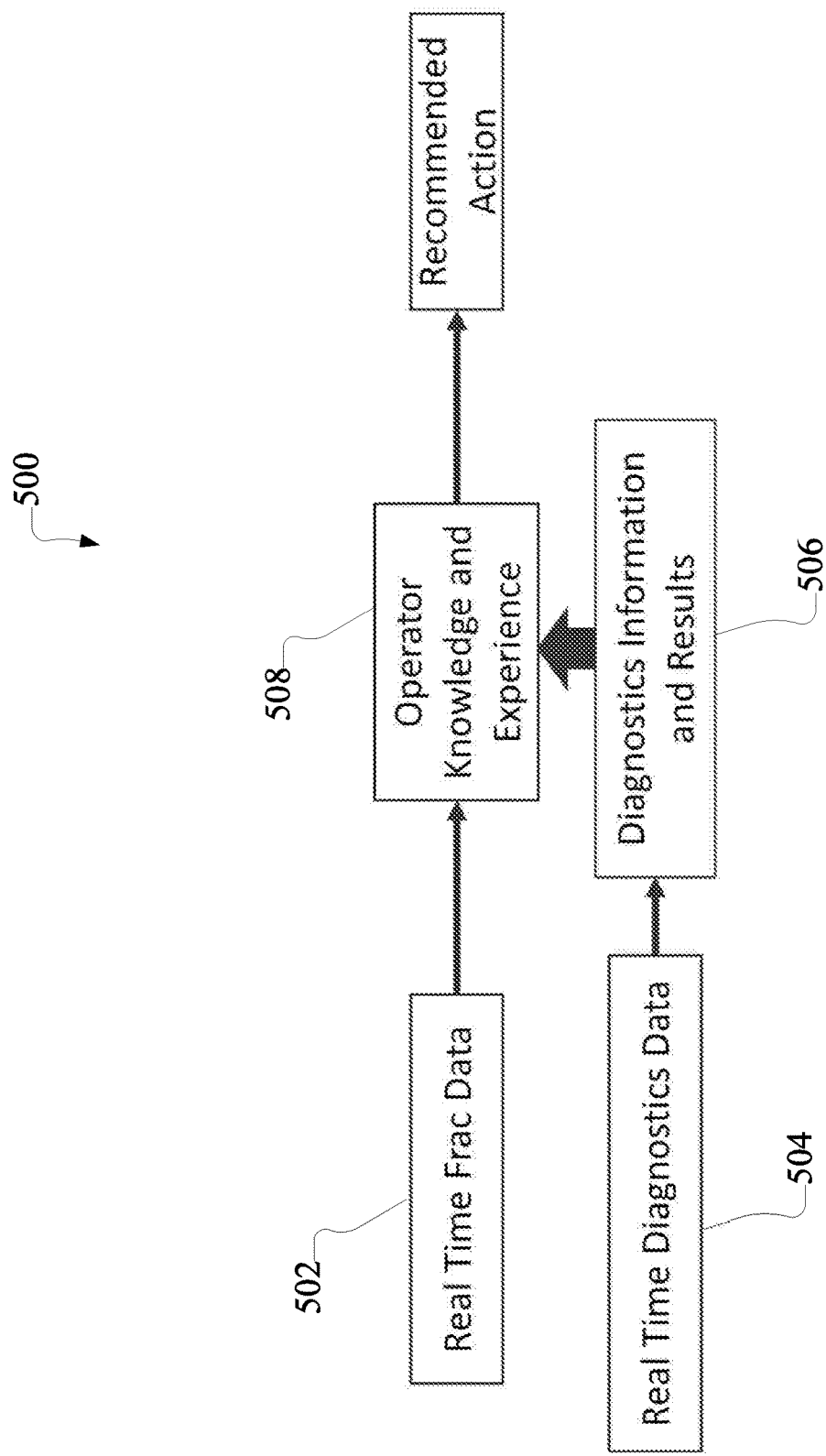
FIG. 5 shows an example flow of a method for controlling a fracturing completion job based on both surface observations and subsurface diagnostics, in accordance with various aspects of the subject technology.

FIG. 5 shows an example flow 500 of a method for controlling a fracturing completion job based on both surface observations and subsurface diagnostics. The method shown in FIG. 5 can be implemented with an applicable fracturing system for completing a wellbore. For example, the method shown in FIG. 5 can be used to control the fracturing system 10 shown in FIG. 1. Further, the method shown in FIG. 5 can be used to control a fracturing system for concurrently performing fracturing stages in multiple wellbores, such as the fracturing system 400 shown in FIG. 4.

The method shown in FIG. 5 can be applied during a fracturing completion job of one or more wellbores. Specifically, and as will be discussed in greater detail later, the method can be applied to perform the fracturing completion job according to one or more fracturing completion plans. More specifically, the method can be applied to identify one or more fracturing completion plans for performing/continuing the fracturing completion job.

A fracturing completion plan, as used herein, can specify how to perform hydraulic fracturing to achieve a target completion in a wellbore. A target completion in a wellbore can specify desired characteristics of a hydraulic fracture completion in a wellbore. For example, a target completion can include fractures that extend anywhere from between 80 and 100 feet into a reservoir to several hundred feet into the reservoir. Further in the example, the target completion can include that the fractures are formed at locations through the wellbore that are spaced apart from each other by 10 feet. A target completion can be specified by a customer. As follows, the fracturing completion job can be performed to achieve, or otherwise attempt to achieve, the target completion for the customer.

In specifying how to perform hydraulic fracturing for a wellbore completion, a fracturing completion plan can include values of varying fracturing completion parameters and/or reservoir parameters. More specifically, a fracturing completion plan can include values of fracturing completion parameters and/or reservoir parameters that vary across different fracturing completion plans, thereby distinguishing the fracturing completion plans from each other. In turn, different fracturing completion plans, corresponding to different values of fracturing completion parameters and/or reservoir parameters, can be applied in performing the fracturing completion job, e.g. to achieve the target completion. For example, in performing the fracturing completion job, an operator can apply an initial fracturing completion plan and modify a fracturing completion parameter of the initial fracturing completion plan, effectively applying a new fracturing completion plan.

Fracturing completion and reservoir parameters can include applicable parameters related to performing hydraulic fracturing, e.g. as part of a well completion, in a formation. Specifically, fracturing completion parameters and reservoir parameters can include applicable parameters that are variable as part of performing hydraulic fracturing in a formation. For example, reservoir parameters can include varying characteristics of a formation, e.g. varying matrix permeability and porosity, in which hydraulic fracturing is or will be performed. Fracturing completion and reservoir parameters can include applicable parameters related to perforation/opening formation in a wellbore as part of performing hydraulic fracturing. For example, fracturing completion parameters can include parameters related to control of a wireline or a non-wireline technique for forming perforations in a wellbore as part a hydraulic fracturing process.

Further, fracturing completion and reservoir parameters can include applicable parameters related to fracture creation and stabilization into a medium through perforations/opening in a wellbore as part of performing hydraulic fracturing. Specifically, fracturing completion and reservoir parameters can include fluid control parameters related to hydraulic fracturing. For example, fracture completion parameters can include a rate at which fluid is pumped into a wellbore for forming fractures through the wellbore. Further, fracturing completion and reservoir parameters can include proppant control parameters related to hydraulic fracturing. For example, fracture completion parameters can include a type of proppant that is pumped into a wellbore, a rate at which the proppant is pumped into the wellbore, and applicable proppant concentration ramp characteristics for stabilizing fractures through the wellbore. Additionally, fracturing completion and reservoir parameters can include additive control parameters. For example, fracture completion parameters can include an amount of at least one of a viscosifier, a friction reducer, a diverter agent, a pH adjustment agent, a surfactant, a clay stabilizer, a formation stabilizer, a viscosity breaker additive, and other applicable additives to add to a proppant mixture pumped down a wellbore for stabilizing fractures through the wellbore.

In the example flow 500 shown in FIG. 5, surface diagnostics data at the fracturing completion job, otherwise referred to as real time fracturing data, is gathered at step 502. Surface diagnostics data can describe applicable surface observations at the fracturing completion job. For example, surface diagnostics data can describe surface pressures and offset or monitoring well pressures at one or more wellbores of the fracturing completion job, injection characteristics of either or both fluid and proppant into the one or more wellbores, and injection characteristics of one or more additives into the one or more wellbores. For example, surface diagnostics data can describe rates at which a diverter is introduced into a wellbore as part of a diverter stage of the fracturing completion job. Surface diagnostics data can be gathered by applicable sensors, equipment, and surface monitoring technique, associated with hydraulic fracturing. For example, surface diagnostics data can be gathered by flow sensors integrated at wellheads of a pad.

Additionally, in the example flow 500 shown in FIG. 5, subsurface diagnostics data at the fracturing completion job, otherwise referred to as real time diagnostics data, is gathered at step 504. Subsurface diagnostics data can describe applicable subsurface diagnostics occurring at the fracture completion job. Specifically, subsurface diagnostics data can describe flowrates per perforation cluster in a wellbore of the fracturing completion job, flowrates per perforation in the wellbore, temperature on stages in the wellbore, microseismic activity in the wellbore, acoustic measurements in the wellbore, strain measurements in the wellbore, bottom hole pressure in the wellbore, and instantaneous shut in pressures in the wellbore. Shut in pressure, as used herein, includes a pressure in a wellbore once fluid, proppant, and additives are no longer pumped into the wellbore at a completion of a fracture creation and stabilization stage. Subsurface diagnostics data can be gathered through applicable sensors, equipment, and subsurface monitoring techniques associated with hydraulic fracturing. For example, subsurface diagnostics data at the fracturing completion job can be gathered using one or more fiber optic cables, e.g. fiber optic cables integrated with one or more wellbores of the fracturing completion job. In another example, subsurface diagnostics data at the fracturing completion job can be gathered by one or more acoustic sensors, e.g. acoustic sensors integrated with one or more wellbores of the fracturing completion job. In yet another example, subsurface diagnostics data at the fracturing completion job can be gathered by one or more strain sensors, e.g. strain sensors integrated with one or more wellbores of the fracturing completion job. In another example, subsurface diagnostics data can be gathered by systems and equipment that measure casing strain and/or well deformation in a wellbore.

Both the surface diagnostics data and the subsurface diagnostics data can be gathered by monitoring off-set wells. Specifically, surface diagnostics data and subsurface diagnostics data for a well can be gathered by monitoring an adjacent well, similar to as is previously discussed with respect to off-set well monitoring. For example, microseismic activity in a well can be monitored through a fiber optic cable implemented in an adjacent well. Further in the example, the monitored well can function only as a monitoring well in which fracturing operations are not actually performed.

Both the surface diagnostics data and the subsurface diagnostics data gathered at steps 502 and 504 can be included as part of completion characteristics data for the fracturing completion job. Completion characteristics data, as used herein, includes data describing applicable characteristics of a well completion job. For example, completion characteristics data can include estimated characteristics of fractures formed and stabilized during the fracturing completion job. Completion characteristics data can be gathered before the fracturing completion job is performed as part of the well completion, while the fracturing completion job is performed as part of the well completion, and after the fracturing completion job is performed as part of the well completion. Specifically, completion characteristics data for the fracturing completion job can be gathered as one or more fracturing completion plans are applied to perform the fracturing completion job. More specifically, the completion characteristics data for the fracturing completion job can be gathered as the fracturing completion job is performed according to changing fracturing completion plans, e.g. as an operator modifies a fracture completion parameters for the fracturing completion job. For example, the completion characteristics data for the fracturing completion job can be gathered as an operator changes a completion plan by introducing a diverter material during a fracturing stage.

At step 506 in the example flow 500 shown in FIG. 5, all or portions of the subsurface diagnostics data for the fracturing completion job are presented to one or more operators associated with the fracturing completion job. An operator associated with the fracturing completion job can include an applicable operator tasked with controlling the fracture completion job. An operator can either be present on-site at the fracture completion job or remote from the site of the fracture completion job. For example, an operator associated with the fracture completion job can be part of a pumping team at a pad of the fracture completion job.

Subsurface diagnostics data can be presented to the operator in an applicable format, e.g. through an applicable graphical user interface. In particular, subsurface diagnostics data can be presented to the operator in a format that allows the operator to quickly perceive the subsurface diagnostics data and react appropriately. This is important, as subsurface diagnostics data can include a large amount of complicated information that is not easily perceivable by a human. By presenting the subsurface diagnostics data in a format that is easily perceivable, the operator can quickly adjust the fracture completion job in response to the subsurface diagnostics data.

In various embodiments, including the method shown in FIG. 5, when the subsurface diagnostics are for multiple wellbores on a fracturing site, e.g. multiple wellbores pumped simultaneously, then the subsurface diagnostics data can be presented in a format that allows an operator to perceive the data for each individual wellbore. Specifically, At step 508, the operator can make a recommended action for controlling the fracture completion job. A recommended action can include not changing a current fracturing completion plan used in performing the fracture completion job. A recommended action can also include changing a current fracturing completion plan used in performing the fracture completion job. Specifically, a recommended action can include modifying one or more fracturing completion and reservoir parameters of a fracturing completion plan used in performing the fracture completion job, effectively performing the fracture completion job using a new fracturing completion plan. For example, a recommended action can include adding a diverter or diverting material during a fracture stage. In another example, a recommended action can include increasing a proppant concentration and/or flow rate in a wellbore. The fracture completion job can subsequently be performed according to the recommended action of the operator, as determined at step 508. Specifically, the operator can implement the recommended action in order to complete the one or more wellbores as part of the fracture completion job.

The operator can identify the recommended action at step 508, based on either or both the surface diagnostics data and the subsurface diagnostics data gathered at steps 502 and 504. Specifically, the operator can identify the recommended action based on the surface diagnostics data and the subsurface diagnostics data and the knowledge and experience of the operator. For example, the Examiner can adjust a flow pressure at which fluid is pumped into a wellbore based on an observed flow rate at a perforation cluster, as indicated by the subsurface diagnostics data, and the operator's own knowledge of an ideal flow rate for the type of formation being fractured.

Figure 6:
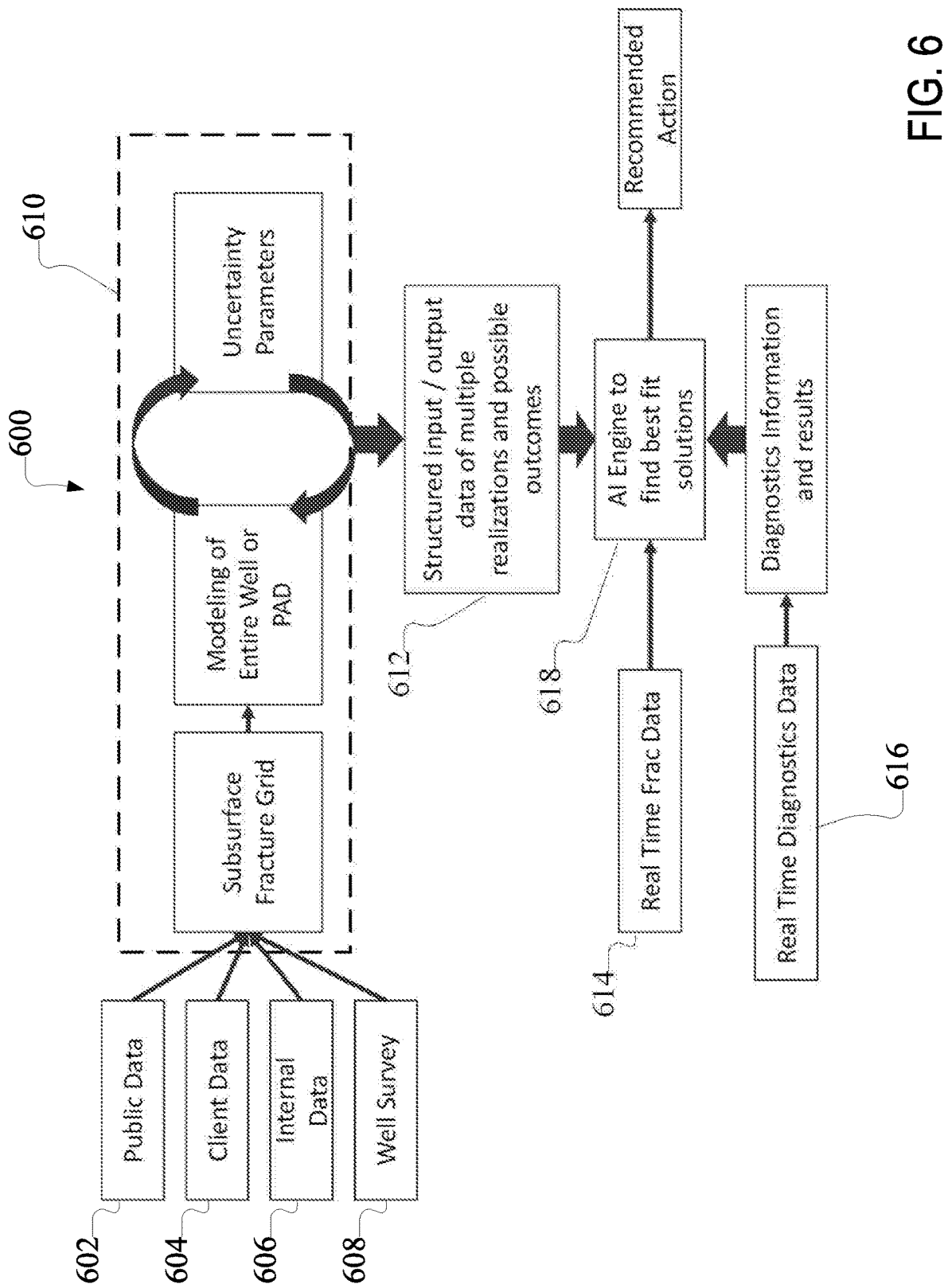
FIG. 6 shows an example flow of a method for performing a fracturing completion job with a fracture completion model, in accordance with various aspects of the subject technology.

FIG. 6 shows an example flow 600 of a method for performing a fracturing completion job with a fracture completion model. In particular, the method shown in FIG. 6 can be utilized to perform a fracture completion job in real time by facilitating control of hydraulic fracturing with a fracture completion model. Further and as will be discussed in greater detail later, the method show in FIG. 6 can account for a large number of fracturing completion and reservoir parameters that a human would otherwise be incapable of accounting for in performing a fracture completion job. In turn, this can lead to a more accurate and efficient completion of one or more wellbores as part of a fracture completion job.

The method shown in FIG. 6 can be implemented with an applicable fracturing system for completing a wellbore. For example, the method shown in FIG. 6 can be used to control the fracturing system 10 shown in FIG. 1. Further, the method shown in FIG. 6 can be used to control a fracturing system for concurrently performing fracturing stages in multiple wellbores, such as the fracturing system 400 shown in FIG. 4. Specifically, the method shown in FIG. 6 can account for a large number of fracturing completion and reservoir parameters that are controlled in completing multiple wellbores simultaneously. This is advantageous as a human would otherwise be incapable of accounting for such a large number of fracturing parameters to control a multi wellbore completion, thereby potentially leading to problems during the completion, e.g. screen outs.

In the method shown in FIG. 6, public data, client data, internal data, and well survey data can be gathered at corresponding steps 602, 604, 606, and 608. Public data can include applicable public data related to subterranean formations and/or hydrocarbon extractions. For example, public data can include wellbore scenario information that operators provide to the public, e.g. have to file with government agencies and public interest groups. Public data can be retrieved from an applicable public wellbore data storage system, such as RS Energy Group®.

Client data can include applicable client data related to subterranean formations, fracture completions, and/or hydrocarbon extractions. For example, client data can include geologic data of a fracture job site of an oil and gas production company. In another example, client data can include all or a portion of a target completion of the fracture completion job. For example, client data can specify that an oil and gas production company wants fractures that extend into a specific hydrocarbon reservoir at horizontal intervals of every 20 feet.

Internal data can include applicable data related to subterranean formations, fracture completions, and/or hydrocarbon extractions that is maintained by an entity responsible for performing the fracture completion job. For example, internal data can include geological data at well sites of past fracture completion jobs. Internal data can be specific to a client of an entity responsible for performing the fracture completion job. Further, internal data can be maintained across a plurality of different clients by an entity responsible for performing the fracture completion job.

Well survey data can include applicable data, e.g. geographical data, related to wells at a site of the current fracture completion jobs. For example, well survey data can include a physical profile of a wellbore at the current fracture completion job. Well survey data can be maintained by a customer, e.g. an oil and gas production company, or an entity responsible for performing the fracture completion job.

At step 610 in the flow 600 shown in FIG. 6, a fracturing completion model is applied to identify a plurality of possible fracturing completion plans for performing the fracture completion job. Specifically, the fracturing completion model can be applied to identify a plurality of possible fracturing completion plans for performing the fracture completion job at a target completion, e.g. a target completion of a client/customer. The possible fracturing completion plans identified through the fracturing completion model can have varying values of fracturing completion and reservoir parameters, e.g. uncertainty parameters for the fracturing completion model. Specifically, the fracturing completion model can vary different fracturing completion and reservoir parameters in order to identify a plurality of possible fracturing completion plans for achieving the target completion. For example, the possible fracturing completion plans can have varying proppant ramp characteristics to achieve the target completion. In another example, the possible fracturing completion plans can have varying fluid pumping times during fracturing stages to achieve the target completion.

Further, in identifying the plurality of possible fracturing completion plans, the fracturing completion model can also identify subsurface fracture simulations corresponding to each of the plurality of possible fracturing completion plans. A subsurface fracture simulation can include a simulated representation of fracture creation and stabilization/possible outcomes in one or more wellbores when a specific fracturing completion plan is performed. Specifically, the fracturing completion model can use a possible fracturing completion plan, as structured input, to generate a corresponding subsurface fracture simulation, as structured output. The fracturing completion model can generate subsurface fracture simulations for each of the identified possible fracturing completion and reservoir parameters. Subsequently and as will be discussed in greater detail later, the subsurface fracture simulations can be used to select a fracturing completion plan from the plurality of possible fracturing completion plans.

The fracturing completion model can be an applicable geomechanical fracture simulator for identifying possible fracturing completion plans by varying values of fracturing completion and reservoir parameters. More specifically, the fracture completion model can be an applicable geomechanical fracture simulator for identifying subsurface fracture simulations for a possible fracturing completion plans. For example, GOHFER® can be used to identify a plurality of possible fracturing completion plans and generate corresponding subsurface fracture simulations for the different possible fracturing completion plans. Further, the fracturing completion model can identify possible fracturing completion plans and corresponding subsurface fracture simulations using one or a combination of the public data, the client data, the internal data, and the well survey data gathered for the fracture completion job at corresponding steps 602, 604, 606, and 608.

The fracturing completion model can simulate fracturing completion plans to identify subsurface fracture simulations using a subsurface fracture grid. Specifically, a subsurface fracture grid can be a simulated physical grid within a subterranean formation of the fracturing completion job. More specifically, a subsurface fracture grid can be a simulated physical grid of the subterranean formation that physically quantifies fractures that are formed according to different fracturing completion plans. In turn, the fracturing completion model can use the subsurface fracture grid to simulate the possible fracturing completion plans and generate subsurface fracture simulations.

At step 612 in the flow 600 of the example method shown in FIG. 6, the possible fracturing completion plans and the corresponding subsurface fracture simulations are provided to a fracturing decision engine. The fracturing decision engine can use the possible fracturing completion plans and the corresponding subsurface fracture simulations to identify a fracturing completion plan to apply in performing the fracture completion job. More specifically, the fracturing decision engine can select a fracturing completion plan to apply in achieving the target completion based on the possible fracturing completion plans and the corresponding subsurface fracture simulations.

The fracturing decision engine can select the fracturing completion plan from the plurality of possible fracturing completion plans through machine learning and artificial intelligence. The fracturing decision engine can use an applicable machine learning and artificial intelligence technique, e.g. one or more completion plan selection model(s), to select the fracturing completion plan from the plurality of possible fracturing completion plans. Specifically, the fracturing decision engine can use machine learning and artificial intelligence, e.g. a completion plan selection model, to select the fracturing completion plan for achieving the target completion in the one or more wellbores during the fracture completion job. For example, the fracturing decision engine can use machine learning and artificial intelligence to select the fracturing completion plan from the possible fracturing completion plans based on a predicted accuracy of the fracturing completion plan in achieving the target completion. Further in the example, the fracturing decision engine can use artificial intelligence and machine learning to predict accuracies of each of the possible fracturing completion plans in achieving the target completion, e.g. based on similarities between the target completion and subsurface fracture simulations of the fracturing completion plans. As follows, the fracturing decision engine can select a possible fracturing completion plan that is predicted to most accurately achieve the target completion.

The selected fracturing completion plan can be an initial fracturing completion plan. Specifically, the selected fracturing completion plan can be the first fracturing completion plan that is implemented to start the fracture completion job. The initial fracturing completion plan can be selected based on a predicted accuracy of the fracturing completion plan in achieving the target completion, e.g. based on similarities between the subsurface fracture simulation of the fracturing completion plan and the target completion. The initial fracturing completion plan can be selected without completion characteristic data of the fracture completion job, e.g. before fracture completion operations are actually carried out to generate the completion characteristic data.

Further, the fracturing completion plan can be a new/replacement fracturing completion plan that can be implemented to replace a current fracturing completion plan in performing the fracture completion job. Specifically, at step 618, the fracturing decision engine can select the new fracturing completion plan while the current fracturing completion plan is performed. As follows, the fracturing completion job can be performed according to the new fracturing completion plan, effectively switching fracturing completion plans. The new fracturing completion plan can be selected and implemented in an attempt to more accurately achieve the target completion. For example, the current fracturing completion plan can be causing screen outs during the fracture completion job leading to failed realization of the target completion. As follows, the new fracturing completion plan can be selected and implemented to reduce screen out occurrences and more closely realize the target completion.

The fracturing decision engine can determine whether to select the new fracturing completion plan from the plurality of possible fracturing completion plans through application of machine learning and artificial intelligence, e.g. through application of a completion plan selection model. The fracturing decision engine can determine whether to select a new completion plan and subsequently select the new fracturing completion plan based on performance characteristics of the currently implemented fracturing completion plan. Specifically, the fracturing decision engine can determine deficiencies of the current fracturing completion plan from completion characteristics data, including surface diagnostics data gathered at step 614 and subsurface diagnostics data gathered at step 616, for the current fracturing completion plan. As follows, the fracturing decision engine can determine to switch to a new fracturing completion plan and subsequently select the new fracturing completion plan based on the completion characteristics data for the current fracturing completion plan. For example, if subsurface diagnostics data indicates that a screen out is occurring, then the fracturing decision engine can select a new fracturing completion plan, e.g. a plan that adds a viscosifier, to reduce the chances of screen out occurrence.

The fracturing decision engine can apply machine learning and artificial intelligence to the completion characteristics data to select a fracturing completion plan, e.g. an initial fracturing completion plan or a replacement fracturing completion plan, from the plurality of possible fracturing completion plans. Specifically, the fracturing decision engine can apply a completion plan selection model that is trained through artificial intelligence and machine learning to the surface diagnostics data and the subsurface diagnostics data to select a fracturing completion plan from the plurality of possible fracturing completion plans. For example, the fracturing decision engine can apply a completion plan selection model to the completion characteristics data to recognize deficiencies in the current fracturing completion plan. As follows, the fracturing decision engine can use the completion plan selection model to select the new fracturing completion plan while accounting for the large number of fracturing completion and reservoir parameters that form the possible fracturing completion plans.

A completion plan selection model can map events, both unfavorable events and favorable events, occurring in a fracture completion to values of fracturing completion and reservoir parameters, e.g. values of parameters that form a fracture completion plan. Further, a completion plan selection model can map events, both unfavorable events and favorable events, occurring in a fracture completion to completion characteristics data, e.g. either or both subsurface and surface diagnostics data. For example, the fracturing decision engine can recognize an occurrence of a runaway fracture by applying machine learning and artificial intelligence to subsurface pressures included in subsurface diagnostics data. Further in the example, the fracturing decision engine can apply the completion plan selection model to diagnose that a diverter material should to be added during a fracturing stage to account for runaway fractures. As follows, the fracturing decision engine can select a new fracturing completion plan that adds the diverter material during the fracturing stage based on application of the completion plan selection model.

Using machine learning and artificial intelligence to select a fracturing completion plane, e.g. a new fracturing completion plan, is advantageous as a human is typically unable to timely analyze the wealth of completion characteristic data. Specifically, a human is typically unable to timely analyze the wealth of completion characteristics data to determine whether to apply a new fracturing completion plan. Further, using machine learning and artificial intelligence to select a new fracturing completion plan is advantageous as a human is typically unable to analyze the large number of fracturing completion parameters and/or reservoir parameters for selecting the new fracturing completion plan. These advantages are further realized when fracturing is performed on multiple wellbores and potentially simultaneously on the multiple wellbores. Specifically, fracturing on multiple wellbores simultaneously can increase the number of fracturing completion parameters and/or reservoir parameters that need to be accounted for and the complexity of the fracturing completion parameters and the reservoir parameters that should be accounted for in selecting a fracturing completion plan, e.g. a new fracturing completion plan. Applying machine learning and artificial intelligence can insure that the numerous and complex fracturing completion and reservoir parameters present in a multi-wellbore fracturing job are properly accounted for in selecting a new fracturing completion plan.

Once a fracturing completion plan is selected from the plurality of possible fracturing completion plans, then the method can include facilitating performance of the fracture completion job according to the selected fracturing completion plan. In facilitating implementation of the selected fracturing completion plan, one or more alerts, actionable alerts, can be presented to an operator for implementing the fracture completion job. For example, an alert can be presented that instructs an operator to increase a concentration of proppant. Further, in facilitating implementation of the selected fracturing completion plan, a fracturing system used in performing the fracturing job can be controlled to implement the fracturing completion plan. Specifically, instructions for implementing the selected fracturing completion plan to the fracturing system and the fracturing system can autonomously control itself according to the instructions to implement the selected fracturing completion plan.

In facilitating performance of the fracture completion job according to the selected fracturing completion plan, the method can include facilitating switching to the new fracturing completion plan for completing the one or more wellbores. Specifically, alerts for implementing, or otherwise switching to the new fracturing completion plan, can be presented to an operator. Subsequently, the operator can use the alerts to control a fracturing system according to the new fracturing completion plan. Further, instructions for implementing the new fracturing completion plan can be provided to the fracturing system. The fracturing system can then autonomously control itself to operate according to the instructions and implement the new fracturing completion plan.

Either or both surface diagnostics data and subsurface diagnostics data, e.g. gathered at steps 614 and 616 can be used to train/retrain the fracturing completion model applied at step 610. In turn, the trained/retrained fracturing completion model can be used to generate a plurality of possible fracturing completion plans. Specifically, the trained/retrained fracturing completion model can be used to generate corresponding subsurface fracturing simulations for each of the possible fracturing completion plans. As follows, the plurality of possible fracturing completion plans and corresponding subsurface fracturing simulations can be analyzed, e.g. based on machine learning, to select a fracture completion plan, e.g. an initial fracturing completion plan or a changed fracturing completion plan, to implement in performing a fracture completion job. The trained/retrained fracturing completion model can be applied to one or a plurality of different fracturing completion jobs from the fracturing completion job that is the subject of the flow 600 shown in FIG. 6.

Further, either or both surface diagnostics data and subsurface diagnostics data, e.g. gathered at steps 614 and 616 can be used to train/retrain the completion plan selection model applied at step 618. In turn, the trained/retrained completion plan selection model can be used to select a new fracture completion plan from the plurality of fracture completion plans for the fracturing completion job. The trained/retrained completion plan selection model can be applied to one or a plurality of different fracturing completion jobs from the fracturing completion job that is the subject of the flow 600 shown in FIG. 6.

The fracturing completion model and/or the completion plan selection model can be trained/retrained using parameters of the fracturing completion plans, e.g. values of varying fracturing completion parameters and/or reservoir parameters, which are applied to formulate the different fracturing completion plans. Specifically, values of parameters of the applied fracturing completion plans can be correlated with the completion characteristics data based on times that the applied fracturing completion plans are implemented and times that the completion characteristics data is generated. This can ensure that the completion characteristics data is accurately associated with values of fracturing completion and reservoir parameters of completion plans that were used to generate the completion characteristics data. As follows, the fracturing completion model and/or the completion plan selection model can be trained/retrained with the completion characteristics data and corresponding values of the fracturing completion and reservoir parameters used in generating the completion characteristics data.

Further, the fracturing completion model and/or the completion plan selection model can be trained/retrained based on specific events occurring during the fracturing completion job. Specifically, an occurrence of an event can be correlated with values of fracturing completion and reservoir parameters at the time the event occurred. Subsequently, the fracturing completion model and/or the completion plan selection model can be trained/retrained based on the values of the fracturing completion and reservoir parameters correlated with the specific event. For example, a runaway fracture can be detected during the fracturing completion job. Further in the example, the values of fracturing completion and reservoir parameters that caused the runway fracture can be correlated with the runaway fracture. Specifically, a flow rate of proppant slurry and fluid that led to the runaway fracture can be correlated with an occurrence of the runaway fracture. In turn, the fracturing completion model and/or the completion plan selection model can be trained/retrained based on the values of the fracturing completion and reservoir parameters that led to the runaway fracture.

While the description has made reference to performing fracturing jobs as part of well completion activities, the techniques and systems described herein can be applied to any applicable situation where a fracturing job is performed. Specifically, the techniques and systems for performing a fracturing job, as described herein, can be applied to perform well workover activities. For example, the techniques and systems described herein can be applied in well workover activities to change a completion based on changing hydrocarbon reservoir conditions. In another example, the techniques and systems described herein can be applied in well workover activities to pull and replace a defective completion.

Figure 7:
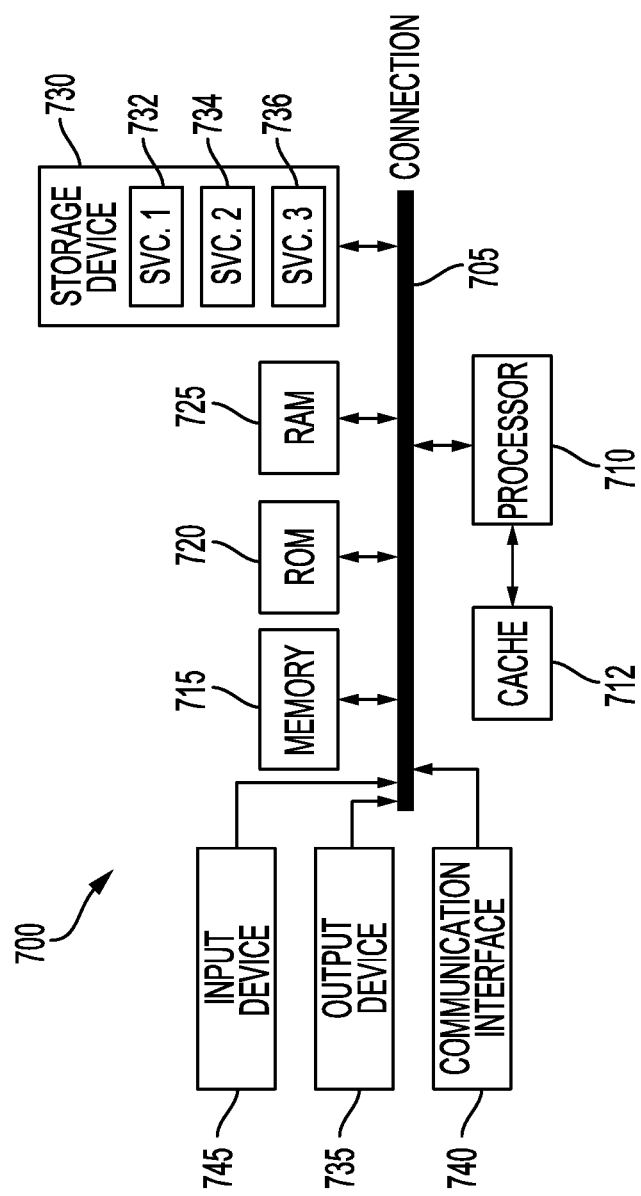
FIG. 7 illustrates an example computing device architecture which can be employed to perform various steps, methods, and techniques disclosed herein.

FIG. 7 illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprises applying a fracturing completion model to identify a plurality of possible fracturing completion plans for completing one or more wellbores at a target completion, wherein the plurality of possible fracturing completion plans include varying values of either or both fracturing completion parameters and reservoir parameters. Further, the method includes gathering completion characteristic data of the one or more wellbores in response to application of at least a portion of a fracturing completion plan of the possible fracturing completion plans in completing the one or more wellbores. Additionally, the method includes determining whether to apply a different fracturing completion plan of the possible fracturing completion plans by applying a completion plan selection model based on the completion characteristics data. The method also includes facilitating switching to the different fracturing completion plan in completing the one or more wellbores if it is determined to apply the different fracturing completion plan.

Statement 2. The method of statement 1, wherein the fracturing completion and reservoir parameters include one or a combination of fluid control parameters, proppant control parameters, and additive control parameters.

Statement 3. The method of statements 1 and 2, wherein the completion characteristic data includes surface diagnostics data of the one or more wellbores in response to application of the fracturing completion plan.

Statement 4. The method of statements 1 through 3, wherein the surface diagnostics data includes one or a combination of surface pressure at the one or more wellbores, injection characteristics of either or both fluid and proppant into the one or more wellbores, and injection characteristics of one or more additives.

Statement 5. The method of statements 1 through 4, wherein the completion characteristic data includes subsurface diagnostics data of the one or more wellbores in response to application of the fracturing completion.

Statement 6. The method of statements 1 through 5, wherein the subsurface diagnostics data includes one or a combination of flowrates per perforation cluster in the one or more wellbores, flowrates per perforation in the one or more wellbores, temperature on stages of the one or more wellbores, microseismic activity in the one or more wellbores, acoustic measurements in the one or more wellbores, strain measurements in the one or more wellbores, and one or more instantaneous shut in pressures in the one or more wellbores.

Statement 7. The method of statements 1 through 6, wherein the subsurface diagnostics data is gathered using at least one of one or more fiber optic cables, one or more acoustic sensors, and one or more strain sensors.

Statement 8. The method of statements 1 through 7, further comprising retraining the fracturing completion model based, at least in part, on the completion characteristic data and the one or more fracturing completion plans of the plurality of possible fracturing completion plans applied in completing the one or more wellbores.

Statement 9. The method of statements 1 through 8, further comprising correlating the completion characteristic data and the one or more completion plans. Further, the method includes retraining the fracturing completion model based, on the completion characteristic data correlated with the one or more completion plans.

Statement 10. The method of statements 1 through 9, wherein the completion characteristic data and the one or more fracturing completion plans are correlated based on times that the one or more fracturing completion plans are executed in completing the one or more wellbores to generate the completion characteristic data.

Statement 11. The method of statements 1 through 10, wherein the fracturing completion plan is an initial fracturing completing plan executed to begin completion of the one or more wellbores.

Statement 12. The method of statements 1 through 11, wherein the initial fracturing completion plan is selected from the plurality of possible fracturing completion plans without the completion characteristic data.

Statement 13. The method of statements 1 through 12, wherein the initial fracturing completion plan is selected from the plurality of possible fracturing completion plans based on a predicted accuracy of the initial fracturing completion plan in achieving the target completion in the one or more wellbores.

Statement 14. The method of statements 1 through 13, wherein the plurality of possible fracturing completion plans are identified by either or both applying the fracturing completion model to a simulated subsurface fracture grid of the one or more wellbores and applying the fracturing completion model to varying values of the fracturing completion parameters and/or the reservoir parameters as uncertainty parameters.

Statement 15. The method of statements 1 through 14, wherein the completion plan selection model is trained based on the completion characteristics data.

Statement 16. The method of statements 1 through 15, wherein facilitating switching to the different fracturing completion plan further comprises either or both providing the different fracturing completion plan to a fracturing control system of a fracturing system completing the one or more wellbores, wherein the fracturing control system is configured to autonomously control the fracturing system to complete the one or more wellbores, at least in part, according to the different fracturing completion plan and presenting instructions for implementing the different fracturing completion plan to one or more operators of a fracturing system completing the one or more wellbores.

Statement 17. The method of statements 1 through 16, further comprising reapplying the fracturing completion model to identify a plurality of reformulated possible fracturing completion plans for further completing the one or more wellbores at the target completion. The method also includes facilitating completion of the one or more wellbores towards the target completion according to one or more reformulated fracturing completion plans of the plurality of reformulated possible fracturing completion plans.

Statement 18. The method of statements 1 through 17, further comprising gathering additional completion characteristic data of the one or more wellbores in response to application of at least a portion of a reformulated fracturing completion plan of the reformulated possible fracturing completion plans in completing the one or more wellbores. Further, the method includes determining whether to apply a different reformulated fracturing completion plan of the reformulated possible fracturing completion plans based on the additional completion characteristics data. Additionally, the method includes facilitating switching to the different reformulated fracturing completion plan in completing the one or more wellbores if it is determined to apply the different reformulated fracturing completion plan.

Statement 19. A system comprising one or more processors and at least one computer-readable storage medium having stored therein instructions. The instructions, when executed by the one or more processors, cause the one or more processors to perform operations comprising applying a fracturing completion model to identify a plurality of possible fracturing completion plans for completing one or more wellbores at a target completion, wherein the plurality of possible fracturing completion plans include varying values of either or both fracturing completion parameters and reservoir parameters. Further, the instructions cause the one or more processors to perform operations comprising gathering completion characteristic data of the one or more wellbores in response to application of at least a portion of a fracturing completion plan of the possible fracturing completion plans in completing the one or more wellbores. Additionally, the instructions cause the one or more processors to perform operations comprising determining whether to apply a different fracturing completion plan of the possible fracturing completion plans by applying a completion plan selection model based on the completion characteristics data. The instructions also cause the one or more processors to perform operations comprising facilitating switching to the different fracturing completion plan in completing the one or more wellbores if it is determined to apply the different fracturing completion plan.

Statement 20. A non-transitory computer-readable storage medium having stored therein instructions which, when executed by one or more processors, cause the one or more processors to perform operations comprising applying a fracturing completion model to identify a plurality of possible fracturing completion plans for completing one or more wellbores at a target completion, wherein the plurality of possible fracturing completion plans include varying values of either or both fracturing completion parameters and reservoir parameters. Further, the instructions cause the one or more processors to perform operations comprising gathering completion characteristic data of the one or more wellbores in response to application of at least a portion of a fracturing completion plan of the possible fracturing completion plans in completing the one or more wellbores. Additionally, the instructions cause the one or more processors to perform operations comprising determining whether to apply a different fracturing completion plan of the possible fracturing completion plans by applying a completion plan selection model based on the completion characteristics data. The instructions also cause the one or more processors to perform operations comprising facilitating switching to the different fracturing completion plan in completing the one or more wellbores if it is determined to apply the different fracturing completion plan.

What is claimed is:

1. A method comprising:
    applying a fracturing completion model to identify a plurality of possible fracturing completion plans for completing one or more wellbores at a target completion, wherein the plurality of possible fracturing completion plans include varying values of either or both fracturing completion parameters and reservoir parameters;
    identifying simulations corresponding to each of the plurality of possible fracturing completion plans;
    gathering completion characteristic data of the one or more wellbores in response to application of at least a portion of a fracturing completion plan of the possible fracturing completion plans in completing the one or more wellbores;
    receiving client data including geological data of the one or more wellbores and a target completion plan designated by a client, the target completion plan specifying desired characteristics in completing the one or more wellbores;
    receiving internal data including geological data of past fracturing completion plans;
    determining whether to apply a different fracturing completion plan of the possible fracturing completion plans by applying a completion plan selection model based on the completion characteristic data, the client data, the internal data, and the simulations; and
    facilitating switching to the different fracturing completion plan in completing the one or more wellbores if it is determined to apply the different fracturing completion plan.

2. The method as recited in claim 1, wherein the fracturing completion and reservoir parameters include one or a combination of fluid control parameters, proppant control parameters, and additive control parameters.

3. The method as recited in claim 1, wherein the completion characteristic data includes surface diagnostics data of the one or more wellbores in response to application of at least the portion of the fracturing completion plan.

4. The method as recited in claim 3, wherein the surface diagnostics data includes one or a combination of surface pressure at the one or more wellbores, injection characteristics of either or both fluid and proppant into the one or more wellbores, and injection characteristics of one or more additives.

5. The method as recited in claim 1, wherein the completion characteristic data includes subsurface diagnostics data of the one or more wellbores in response to application of the fracturing completion model.

6. The method as recited in claim 5, wherein the subsurface diagnostics data includes one or a combination of flowrates per perforation cluster in the one or more wellbores, flowrates per perforation in the one or more wellbores, temperature on stages of the one or more wellbores, microseismic activity in the one or more wellbores, acoustic measurements in the one or more wellbores, strain measurements in the one or more wellbores, and one or more instantaneous shut in pressures in the one or more wellbores.

7. The method as recited in claim 5, wherein the subsurface diagnostics data is gathered using at least one of:
    one or more fiber optic cables;
    one or more acoustic sensors; and
    one or more strain sensors.

8. The method as recited in claim 1, further comprising retraining the fracturing completion model based, at least in part, on the completion characteristic data and the one or more fracturing completion plans of the plurality of possible fracturing completion plans applied in completing the one or more wellbores.

9. The method as recited in claim 1, further comprising:
    correlating the completion characteristic data and the one or more fracturing completion plans; and
    retraining the fracturing completion model based on the completion characteristic data correlated with the one or more fracturing completion plans.

10. The method as recited in claim 9, wherein the completion characteristic data and the one or more fracturing completion plans are correlated based on times that the one or more fracturing completion plans are executed in completing the one or more wellbores to generate the completion characteristic data.

11. The method as recited in claim 1, wherein the fracturing completion plan is an initial fracturing completing plan executed to begin completion of the one or more wellbores.

12. The method as recited in claim 11, wherein the initial fracturing completion plan is selected from the plurality of possible fracturing completion plans without the completion characteristic data.

13. The method as recited in claim 11, wherein the initial fracturing completion plan is selected from the plurality of possible fracturing completion plans based on a predicted accuracy of the initial fracturing completion plan in achieving the target completion in the one or more wellbores.

14. The method as recited in claim 1, wherein the plurality of possible fracturing completion plans are identified by either or both:
    applying the fracturing completion model to a simulated subsurface fracture grid of the one or more wellbores; and
    applying the fracturing completion model to varying values of the fracturing completion parameters and/or the reservoir parameters as uncertainty parameters.

15. The method as recited in claim 1, wherein the completion plan selection model is trained based on the completion characteristics data.

16. The method as recited in claim 1, wherein facilitating switching to the different fracturing completion plan further comprises either or both:
    providing the different fracturing completion plan to a fracturing control system of a fracturing system completing the one or more wellbores, wherein the fracturing control system is configured to autonomously control the fracturing system to complete the one or more wellbores, at least in part, according to the different fracturing completion plan; and presenting instructions for implementing the different fracturing completion plan to one or more operators of the fracturing system completing the one or more wellbores.

17. The method as recited in claim 1, further comprising:

reapplying the fracturing completion model to identify a plurality of reformulated possible fracturing completion plans for further completing the one or more wellbores at the target completion; and facilitating completion of the one or more wellbores towards the target completion according to one or more reformulated fracturing completion plans of the plurality of reformulated possible fracturing completion plans.

18. The method as recited in claim 17, further comprising:

gathering additional completion characteristic data of the one or more wellbores in response to application of at least a portion of a reformulated fracturing completion plan of the reformulated possible fracturing completion plans in completing the one or more wellbores;

determining whether to apply a different reformulated fracturing completion plan of the reformulated possible fracturing completion plans based on the additional completion characteristics data; and facilitating switching to the different reformulated fracturing completion plan in completing the one or more wellbores if it is determined to apply the different reformulated fracturing completion plan.

19. A system comprising:

one or more processors; and at least one computer-readable storage medium having stored therein instructions which, when executed by the one or more processors, cause the one or more processors to perform operations comprising:

applying a fracturing completion model to identify a plurality of possible fracturing completion plans for completing one or more wellbores at a target completion, wherein the plurality of possible fracturing completion plans include varying values of either or both fracturing completion parameters and reservoir parameters;

identifying simulations corresponding to each of the plurality of possible fracturing completion plans;

gathering completion characteristic data of the one or more wellbores in response to application of at least a portion of a fracturing completion plan of the possible fracturing completion plans in completing the one or more wellbores;

receiving client data including geological data of the one or more wellbores and a target completion plan designated by a client;

receiving internal data including geological data of past fracturing completion plans from a third party, the target completion plan specifying desired characteristics in completing the one or more wellbores;

determining whether to apply a different fracturing completion plan of the possible fracturing completion plans by applying a completion plan selection model based on the completion characteristic data, the client data, the internal data, and the simulations; and facilitating switching to the different fracturing completion plan in completing the one or more wellbores if it is determined to apply the different fracturing completion plan.

20. A non-transitory computer-readable storage medium having stored therein instructions which, when executed by one or more processors, cause the one or more processors to perform operations comprising:

applying a fracturing completion model to identify a plurality of possible fracturing completion plans for completing one or more wellbores at a target completion, wherein the plurality of possible fracturing completion plans include varying values of either or both fracturing completion parameters and reservoir parameters;

identifying simulations corresponding to each of the plurality of possible fracturing completion plans;

gathering completion characteristic data of the one or more wellbores in response to application of at least a portion of a fracturing completion plan of the possible fracturing completion plans in completing the one or more wellbores;

receiving client data including geological data of the one or more wellbores and a target completion plan designated by a client, the target completion plan specifying desired characteristics in completing the one or more wellbores;

receiving internal data including geological data of past fracturing completion plans from a third party;

determining whether to apply a different fracturing completion plan of the possible fracturing completion plans by applying a completion plan selection model based on the completion characteristic data, the client data, the internal data, and the simulations; and facilitating switching to the different fracturing completion plan in completing the one or more wellbores if it is determined to apply the different fracturing completion plan.

* * * * *